(12) United States Patent
Voth et al.

(10) Patent No.: US 7,702,580 B1
(45) Date of Patent: Apr. 20, 2010

(54) SYSTEM AND METHOD FOR MORTGAGE LOAN PRICING, SALE AND FUNDING

(75) Inventors: David N. Voth, Oakton, VA (US); Peter A. Simon, Washington, DC (US); Richard N. Plotnick, McLean, VA (US); Scott Youngman, Fairfax, VA (US); Patricia D. Fulcher, Clinton, MD (US); Neiman Alvarez, Washington, DC (US); Andrew Huffman, Vienna, VA (US); Anne Harrell, Arlington, VA (US); George Saad, Potomac Falls, VA (US); Michael J. Kane, Arlington, VA (US)

(73) Assignee: Fannie Mae, Washington, DC (US)

( * ) Notice: Subject to any disclaimer, the term of this patent is extended or adjusted under 35 U.S.C. 154(b) by 1598 days.

(21) Appl. No.: 10/329,878

(22) Filed: Dec. 26, 2002

Related U.S. Application Data

(63) Continuation-in-part of application No. 09/593,106, filed on Jun. 13, 2000.

(60) Provisional application No. 60/343,950, filed on Dec. 28, 2001.

(51) Int. Cl.
   *G06Q 40/00* (2006.01)
(52) U.S. Cl. ............................ 705/40; 705/35; 705/37; 705/38; 705/36; 705/39
(58) Field of Classification Search .................. None
   See application file for complete search history.

(56) References Cited

U.S. PATENT DOCUMENTS

| | | | |
|---|---|---|---|
| 3,316,395 A | 4/1967 | Lavin | |
| 4,876,648 A | 10/1989 | Lloyd | |
| 5,239,462 A | 8/1993 | Jones et al. | |
| 5,262,941 A | 11/1993 | Saladin et al. | |
| 5,274,547 A | 12/1993 | Zoffel et al. | |
| 5,323,315 A | 6/1994 | Highbloom | |

(Continued)

FOREIGN PATENT DOCUMENTS

| | | |
|---|---|---|
| JP | 04182868 | 6/1992 |
| JP | 2002007701 | 1/2002 |
| JP | 2002259696 | 9/2002 |
| JP | 2002288426 | 10/2002 |
| JP | 2003223559 | 8/2003 |

(Continued)

OTHER PUBLICATIONS

Breakthrough's in Mortgage Banking Looking Toward the Future Real Estate Finance Press Mortgage Bankers Association of America 1996. pp. 5-1-5-8 ISBN 1-57599-016-4 Jess Lederman, Editor.*

(Continued)

*Primary Examiner*—Kambiz Abdi
*Assistant Examiner*—Benjamin S Fields
(74) *Attorney, Agent, or Firm*—Foley & Lardner LLP

(57) ABSTRACT

Systems and methods for optimizing servicing fees for a set of loans are disclosed. A system for optimizing servicing fees for a set of loans may include a processing unit and a storage device coupled to the processing unit having stored therein information for configuring the processing unit to obtain a minimum servicing fee and a maximum servicing fee, identify net benefits of increasing servicing fees for the loans in the set of loans, and iteratively adjust the servicing fee until the optimal servicing fee is attained.

4 Claims, 19 Drawing Sheets

U.S. PATENT DOCUMENTS

| | | |
|---|---|---|
| 5,361,201 A | 11/1994 | Jost et al. |
| 5,414,621 A | 5/1995 | Hough |
| 5,537,315 A | 7/1996 | Mitcham |
| 5,563,783 A | 10/1996 | Stolfo et al. |
| 5,611,052 A * | 3/1997 | Dykstra et al. ............... 705/38 |
| 5,615,268 A | 3/1997 | Bisbee et al. |
| 5,689,649 A | 11/1997 | Altman et al. |
| 5,689,650 A | 11/1997 | McClelland et al. |
| 5,696,907 A | 12/1997 | Tom |
| 5,699,527 A | 12/1997 | Davidson |
| 5,732,400 A | 3/1998 | Mandler et al. |
| 5,765,144 A | 6/1998 | Larche et al. |
| 5,797,133 A | 8/1998 | Jones et al. |
| 5,870,721 A | 2/1999 | Norris |
| 5,878,403 A | 3/1999 | DeFrancisco et al. |
| 5,878,404 A | 3/1999 | Stout, Jr. et al. |
| 5,930,775 A | 7/1999 | McCauley et al. |
| 5,930,776 A | 7/1999 | Dykstra et al. |
| 5,940,811 A | 8/1999 | Norris |
| 5,940,812 A | 8/1999 | Tengel et al. |
| 5,966,699 A | 10/1999 | Zandi |
| 5,966,700 A | 10/1999 | Gould et al. |
| 5,970,464 A | 10/1999 | Apte et al. |
| 5,974,372 A | 10/1999 | Barnes et al. |
| 5,983,206 A | 11/1999 | Oppenheimer |
| 5,995,947 A | 11/1999 | Fraser et al. |
| 6,014,645 A | 1/2000 | Cunningham |
| 6,021,202 A | 2/2000 | Anderson et al. |
| 6,029,149 A | 2/2000 | Dykstra et al. |
| 6,035,288 A | 3/2000 | Solomon |
| 6,044,362 A | 3/2000 | Neely |
| 6,070,151 A | 5/2000 | Frankel |
| 6,076,070 A | 6/2000 | Stack |
| 6,088,686 A | 7/2000 | Walker et al. |
| 6,105,007 A | 8/2000 | Norris |
| 6,112,190 A | 8/2000 | Fletcher et al. |
| 6,119,103 A | 9/2000 | Basch et al. |
| 6,125,349 A | 9/2000 | Maher |
| 6,144,948 A | 11/2000 | Walker et al. |
| 6,202,053 B1 | 3/2001 | Christiansen et al. |
| 6,226,624 B1 | 5/2001 | Watson et al. |
| 6,233,566 B1 | 5/2001 | Levine et al. |
| 6,289,319 B1 | 9/2001 | Lockwood |
| 6,304,858 B1 | 10/2001 | Mosler et al. |
| 6,311,169 B2 | 10/2001 | Duhon |
| 6,324,526 B1 | 11/2001 | D'Agostino |
| 6,367,013 B1 | 4/2002 | Bisbee et al. |
| 6,385,594 B1 | 5/2002 | Lebda et al. |
| 6,401,070 B1 | 6/2002 | McManus et al. |
| 6,405,101 B1 | 6/2002 | Johanson et al. |
| 6,405,181 B2 | 6/2002 | Lent et al. |
| 6,430,539 B1 | 8/2002 | Lazarus et al. |
| 6,438,526 B1 | 8/2002 | Dykes et al. |
| 6,505,176 B2 | 1/2003 | DeFrancesco, Jr. et al. |
| 6,513,018 B1 | 1/2003 | Culhane |
| 6,532,450 B1 | 3/2003 | Brown et al. |
| 6,584,467 B1 | 6/2003 | Haught et al. |
| 6,594,635 B1 | 7/2003 | Erlanger |
| 6,609,109 B1 | 8/2003 | Bradley et al. |
| 6,611,816 B2 | 8/2003 | Lebda et al. |
| 6,651,884 B2 | 11/2003 | Prendergast et al. |
| 6,671,673 B1 | 12/2003 | Baseman et al. |
| 6,823,319 B1 | 11/2004 | Lynch et al. |
| 6,985,886 B1 | 1/2006 | Broadbent et al. |
| 6,988,082 B1 | 1/2006 | Williams et al. |
| 7,089,503 B1 | 8/2006 | Bloomquist et al. |
| 7,107,241 B1 | 9/2006 | Pinto |
| 7,146,337 B1 | 12/2006 | Ward et al. |
| 7,310,618 B2 | 12/2007 | Libman |
| 7,315,841 B1 | 1/2008 | McDonald et al. |
| 2001/0029482 A1 | 10/2001 | Tealdi et al. |
| 2001/0032178 A1 | 10/2001 | Adams et al. |
| 2001/0037287 A1 | 11/2001 | Broadbent et al. |
| 2001/0039482 A1 | 11/2001 | Satterfield |
| 2001/0042035 A1 | 11/2001 | Kelly et al. |
| 2001/0047326 A1 | 11/2001 | Broadbent et al. |
| 2002/0019804 A1 | 2/2002 | Sutton |
| 2002/0023051 A1 | 2/2002 | Kunzle et al. |
| 2002/0029154 A1 | 3/2002 | Majoor |
| 2002/0029194 A1 | 3/2002 | Lewis et al. |
| 2002/0032635 A1 | 3/2002 | Harris et al. |
| 2002/0035520 A1 | 3/2002 | Weiss |
| 2002/0038318 A1 | 3/2002 | Cochran et al. |
| 2002/0040339 A1 | 4/2002 | Dhar et al. |
| 2002/0052815 A1 | 5/2002 | Johnson et al. |
| 2002/0052835 A1 | 5/2002 | Toscano |
| 2002/0059137 A1 | 5/2002 | Freeman et al. |
| 2002/0077968 A1 | 6/2002 | Kaniwa et al. |
| 2002/0087364 A1 | 7/2002 | Lerner et al. |
| 2002/0087389 A1 | 7/2002 | Sklarz et al. |
| 2002/0091550 A1 | 7/2002 | White et al. |
| 2002/0091630 A1 | 7/2002 | Inoue |
| 2002/0099650 A1 | 7/2002 | Cole |
| 2002/0111835 A1 | 8/2002 | Hele et al. |
| 2002/0111901 A1 * | 8/2002 | Whitney ...................... 705/38 |
| 2002/0138414 A1 | 9/2002 | Baker, IV |
| 2002/0152155 A1 | 10/2002 | Greenwood et al. |
| 2002/0152165 A1 | 10/2002 | Dutta et al. |
| 2002/0152170 A1 | 10/2002 | Dutta et al. |
| 2003/0018558 A1 | 1/2003 | Heffner et al. |
| 2003/0023610 A1 | 1/2003 | Bove et al. |
| 2003/0028478 A1 | 2/2003 | Kinney et al. |
| 2003/0033241 A1 | 2/2003 | Harari |
| 2003/0033242 A1 | 2/2003 | Lynch et al. |
| 2003/0036994 A1 | 2/2003 | Witzig et al. |
| 2003/0036995 A1 | 2/2003 | Lazerson |
| 2003/0036996 A1 | 2/2003 | Lazerson |
| 2003/0046223 A1 | 3/2003 | Crawford et al. |
| 2003/0055778 A1 | 3/2003 | Erlanger |
| 2003/0065614 A1 | 4/2003 | Sweeney |
| 2003/0093366 A1 | 5/2003 | Halper et al. |
| 2003/0110249 A1 | 6/2003 | Buus et al. |
| 2003/0144949 A1 | 7/2003 | Blanch |
| 2003/0149658 A1 | 8/2003 | Rossbach et al. |
| 2003/0167191 A1 | 9/2003 | Slabonik et al. |
| 2003/0172025 A1 | 9/2003 | Gallina |
| 2003/0177032 A1 | 9/2003 | Bonissone et al. |
| 2003/0182159 A1 | 9/2003 | Bonissone et al. |
| 2003/0187696 A1 | 10/2003 | Bonissone et al. |
| 2003/0187697 A1 | 10/2003 | Bonissone et al. |
| 2003/0187698 A1 | 10/2003 | Bonissone et al. |
| 2003/0187699 A1 | 10/2003 | Bonissone et al. |
| 2003/0187700 A1 | 10/2003 | Bonissone et al. |
| 2003/0187701 A1 | 10/2003 | Bonissone et al. |
| 2003/0187702 A1 | 10/2003 | Bonissone et al. |
| 2003/0208385 A1 | 11/2003 | Zander et al. |
| 2003/0212654 A1 | 11/2003 | Harper et al. |
| 2003/0217034 A1 | 11/2003 | Shutt |
| 2003/0220879 A1 | 11/2003 | Gaughan et al. |
| 2003/0225662 A1 | 12/2003 | Horan et al. |
| 2003/0229553 A1 | 12/2003 | Kongyingyong et al. |
| 2003/0229581 A1 | 12/2003 | Green et al. |
| 2003/0233260 A1 | 12/2003 | Snell et al. |
| 2003/0233316 A1 | 12/2003 | Hu et al. |
| 2004/0002915 A1 | 1/2004 | McDonald et al. |
| 2004/0019517 A1 | 1/2004 | Sennott |
| 2004/0030616 A1 | 2/2004 | Florance et al. |
| 2004/0030649 A1 | 2/2004 | Nelson et al. |
| 2004/0034592 A1 | 2/2004 | Hu et al. |
| 2004/0049439 A1 | 3/2004 | Johnston et al. |
| 2004/0049445 A1 | 3/2004 | Kishore |
| 2004/0059653 A1 | 3/2004 | Verkuylen et al. |
| 2004/0064402 A1 | 4/2004 | Dreyer et al. |
| 2004/0107161 A1 | 6/2004 | Tanaka et al. |

| | | | |
|---|---|---|---|
| 2004/0122717 A1 | 6/2004 | Handcock | |
| 2004/0138996 A1 | 7/2004 | Bettenburg et al. | |
| 2004/0225596 A1 | 11/2004 | Kemper et al. | |
| 2005/0289046 A1 | 12/2005 | Conyack | |

FOREIGN PATENT DOCUMENTS

| | | |
|---|---|---|
| WO | WO 9948036 | 9/1999 |
| WO | WO 0021011 | 4/2000 |
| WO | WO 0062209 | 10/2000 |
| WO | WO 0075833 | 12/2000 |
| WO | WO 0116845 | 3/2001 |
| WO | WO 0118718 | 3/2001 |
| WO | WO 01/27832 | 4/2001 |
| WO | WO 0133461 | 5/2001 |
| WO | WO 0139079 | 5/2001 |
| WO | WO 01/41019 | 6/2001 |
| WO | WO 0150318 | 7/2001 |
| WO | WO 0163445 | 8/2001 |
| WO | WO 0163446 | 8/2001 |
| WO | WO 0163534 | 8/2001 |
| WO | WO 0180123 | 10/2001 |
| WO | WO 0198999 | 12/2001 |
| WO | WO 02/06989 | 1/2002 |
| WO | WO 0208855 | 1/2002 |
| WO | WO 0223443 | 3/2002 |
| WO | WO 02/084925 | 10/2002 |
| WO | WO 02093286 | 11/2002 |
| WO | WO 03009152 | 1/2003 |
| WO | WO 03/071380 | 8/2003 |
| WO | WO 03/071388 | 8/2003 |

OTHER PUBLICATIONS

REASA Real Estate Automated Service Associates, LLC website materials (www.reasa.com).

Fannie Mae, "Guide to Underwriting with Desktop Underwriter®", Sep. 2002; 63 pgs.

Edocs, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, "E-Commerce Holds Keys to Home Ownership: Fannie Mae drives hug volumes of mortgage business to its e-marketplace," Internetweek.com, Undated, 5 pgs., Internetweek.com, USA.

Smith Tom , "Fannie Mae Ramps up Web Apps: Q&A with Julie St. John , Executive Vice President and Chief Technology Office and Michael Williams President of Fannie Mae e-Business," Internetweek.com, Undated, 11 pgs., Internetweek.com, USA.

Sun, "Success on Sun: Software Development Case Study Federal National Mortgage Association (Fannie Mae)," Mar. 1995, 10 pgs, Sun, USA.

Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "Guide to Underwriting with Desktop Underwriter", Oct. 1997, 152 pages, Verison 4.0, Fannie Mae, Washington, DC, USA.

Fannie Mae, "MORNET MBS Pool Submission System User's Guide", Sep. 1998, 259 pages, Version 5.3, Fannie Mae, Washington, DC, USA.

Fannie Mae, "Making Good Delivery A Guide to Delivering Loans for Cash and MBS", 1994, 121 pages, Fannie Mae, Washington, DC, USA.

Fannie Mae, "MORNET Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "MORNET Manager User's Guide", Nov. 1998, 187 pages, Version 3.0, Fannie Mae, Washington, DC, USA.

Fannie Mae, "MORNET Servicing Support System User's Guide", Dec. 1998, 370 pages, Fannie Mae, Washington, DC, USA.

Fannie Mae, "Selling", 1995-2002 et al, 1119 pgs, Fannie Mae, USA.

Fannie Mae, "Investor Accounting: Cash", 1996, 132 pages, Fannie Mae, Washington, DC, USA.

Fannie Mae, "Secondary Marketing: Cash", 1997, 81 pages, Fannie Mae, USA.

Fannie Mae, "General Servicing Fundamentals", 1996, 174 pages, Fannie Mae, USA.

Laser Overview, May 1993, chapters 1-18.

Fannie Mae, "Servicing Guide", 1995-2002 et al, 319 pages, Forward, Table of Contents, Sections III, IX, X, and XI, Fannie Mae, USA.

E-Loan; Qualify for a Loan, Pre-Qualifying Interview, printed on Feb. 1, 1999, available at http://eloan.com/cgi-bin, 5 pages.

Home Shark Loan Application, printed on Feb. 1, 1999, available at https://loanforms.homeshark.com/secure, 15 pages.

Home Shark Prequalification, printed on Feb. 1, 1999, available at https://loanforms.homeshark.com/secure/CAnalysis, 3 pages.

iQualify.com; Loan Application, printed on Feb. 1, 1999, available at http://secure01.iqualify.com/scripts/prodselectupd, 15 pages.

LendingTree, Mortgage, Apply Online, printed on Feb. 1, 1999, available at https://loans./lendingtree.com, 7 pages.

Neal, Paul E., "Strategic Overview of Pricing and Price Competition", Breakthroughs in Mortgage Banking, J. Lederman, Editor, 1996, Mortgage Bankers Associate of America, 12 pages.

Notice of Allowance for U.S. Appl. No. 10/331,680, date mailed Nov. 16, 2004, 6 pages.

Notice of Allowance for U.S. Appl. No. 11/322,576, date mailed May 19, 2009, 4 pages.

Office Action for U.S. Appl. No. 09/593,106, date mailed Apr. 10, 2003, 11 pages.

Office Action for U.S. Appl. No. 09/593,106, date mailed Aug. 30, 2002, 12 pages.

Office Action for U.S. Appl. No. 09/593,106, date mailed Dec. 2, 2004, 5 pages.

Office Action for U.S. Appl. No. 09/593,106, date mailed Jan. 20, 2004, 10 pages.

Decision on Request for Rehearing, dated Oct. 31, 2007, 3 pages.

Office Action for US Appl. No. 10/329,634, date mailed Apr. 28, 2009, 13 pages.

Office Action for U.S. Appl. No. 10/329,634, date mailed Mar. 17, 2008, 12 pages.

Office Action for U.S. Appl. No. 10/329,634, date mailed Nov. 13, 2008, 12 pages.

Office Action for U.S. Appl. No. 10/743,484, date mailed Jan. 16, 2009, 10 pages.

Office Action for U.S. Appl. No. 10/743,506, date mailed Dec. 22, 2008, 15 pages.

Office Action for U.S. Appl. No. 10/744,166, date mailed Feb. 2, 2009, 14 pages.

Office Action for U.S. Appl. No. 10/745,103, date mailed Apr. 2, 2008, 14 pages.

Office Action for U.S. Appl. No. 11/490,614, date mailed Jul. 9, 2009, 18 pages.

Office Action for U.S. Appl. No. 11/490,614, date mailed Oct. 28, 2008, 5 pages.

Fannie Mae, "Selling", Jun. 30, 2002, 52 pages. Fannie Mae, USA.

Amendment and Reply under 37 CFR 1.111, dated Aug. 8, 2003, for co-pending U.S. Appl. No. 09/593,106, which is the parent of U.S. Appl. No. 10/331,680.

Reply and Amendment, dated Dec. 23, 2002, for co-pending U.S. Appl. No.. 09/593,106, which is the parent of U.S. Appl. No. 10/331,680.

Non-final Office Action for U.S. Appl. No. 09/593,106, dated Apr. 10, 2003.

\* cited by examiner

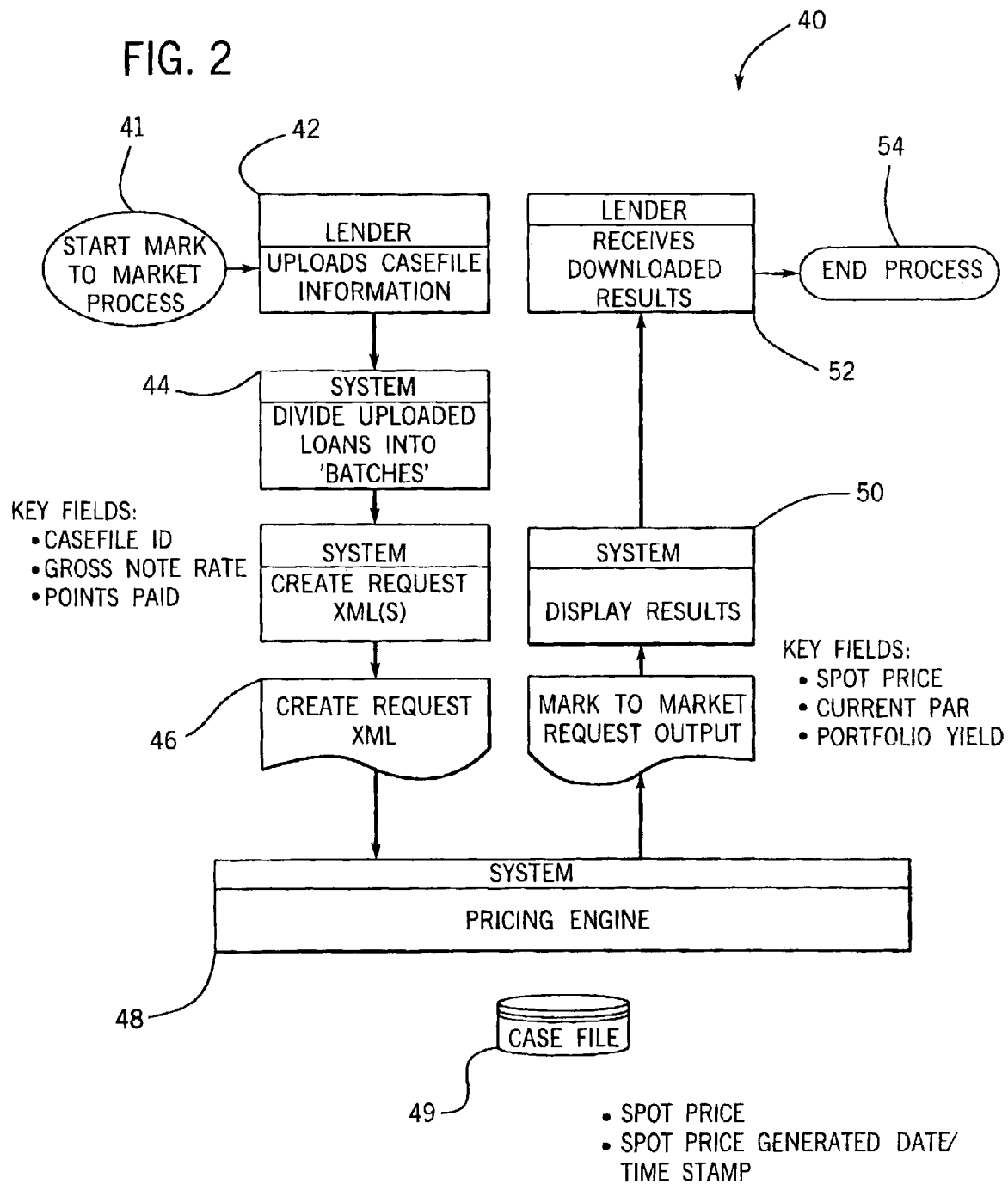

LOAN DETAIL
| 30 YEAR FIXED | 15 YEAR FIXED | 7 YEAR BALLOON |

LOAN COUNT: 46
LOANS NOT PRICED: -
LOANS EXCLUDED: 0
REMITTANCE TYPE: SCHEDULED / SCHEDULED
TOTAL LOAN AMOUNT: $4,345,927.73

WEIGHTED AVERAGE SERVICING: 31.71
WEIGHTED AVERAGE PTR: -
WEIGHTED AVERAGE PORTFOLIO YIELD RATE: -
WEIGHTED AVERAGE NOTE RATE: -
WEIGHTED AVERAGE MARKET PRICE: -

FILTER: [ ALL LOANS ▼ ]

SHOWN: 1..20 OF 30   <PREV 20 | 1 2 3 | NEXT 20>

| ROW | CASEFILE ID | LOAN AMOUNT ($) | LAST SPOT PRICE | DELIVERY ADJUSTMENT (bps) | RETAINED SERVICING (bps) |
|---|---|---|---|---|---|
| 1. | 2000197160 | 110,000.00 | – | – | 25 |
| 2. | 2000206820 | 59,500.00 | – | – | 25 |
| 3. | 2000207840 | 229,500.00 | – | – | 40 |
| 4. | 2100182561 | 107,200.00 | – | – | 35 |
| 5. | 2100202571 | 138,500.00 | – | – | 30 |
| 6. | 2100205591 | 74,997.00 | – | – | 30 |
| 7. | 2200197972 | 144,000.00 | – | – | 30 |
| 8. | 2200208202 | 193,500.00 | – | – | 30 |
| 9. | 2400199974 | 84,500.00 | – | – | 30 |
| 10. | 2400206884 | 123,000.00 | – | – | 30 |
| 11. | 2400206964 | 54,000.00 | – | – | 30 |
| 12. | 2500190875 | 139,997.00 | – | – | 30 |
| 13. | 2500205425 | 76,500.00 | – | – | 30 |
| 14. | 2500207745 | 240,000.00 | – | – | 30 |
| 15. | 2600208116 | 134,000.00 | – | – | 30 |
| 16. | 2700201227 | 81,000.00 | – | – | 30 |
| 17. | 2700203697 | 108,000.00 | – | – | 30 |
| 18. | 2700207117 | 124,200.00 | – | – | 30 |
| 19. | 2800202468 | 70,000.00 | – | – | 30 |
| 20. | 2800204818 | 171,000.00 | – | – | 30 |

SHOWN: 1..20 OF 30   <PREV 20 | 1 2 3 | NEXT 20>

FIG. 4

| HOME | LOAN TO VALUE | LOAN TO SELL | SERVICING | LOAD DATA | PROFILE |

[LOG OUT] [HELP]

EDIT LOANS TO VALUE

1. TYPE IN NEW SERVICING FEES IN THE RETAINED SERVICING COLUMN.
2. TO EXCLUDE A LOAN FROM FUTURE TRANSACTIONS, UNCHECK ITS ROW.
   • CHANGE SERVICING FEES BY PRODUCT

LOAN DETAIL

| 30 YEAR FIXED | 15 YEAR FIXED | 7 YEAR BALLOON |

FILTER: [ ALL LOANS ▼ ]

SHOWN 1..20 OF 60    <PREV 20 | 1 2 3 | NEXT 20>

| EXCLUDE CASEFILE ID | LOAN AMOUNT | MOST RECENT SPOT PRICE | DELIVERY BASE ADJUSTMENT RATE | SERVICE (bps) |
|---|---|---|---|---|
| ☐ 2000197160 | 110,000.00 | $110,000.00 | 0bps | bps |
| ☐ 2000206820 | 59,500.00 | $59,500.00 | 0bps | bps |
| ☐ 2000207840 | 229,500.00 | $229,500.00 | 0bps | 40 bps |
| ☐ 2100182561 | 107,200.00 | ERROR | 0bps | 30 bps |
| ☐ 2100202571 | 138,500.00 | $138,500.00 | 0bps | 30 bps |
| ☐ 2100205591 | 74,997.00 | $74,997.00 | 0bps | 30 bps |
| ☐ 2200197972 | 144,000.00 | $144,000.00 | 0bps | 30 bps |
| ☐ 2200208202 | 193,500.00 | $193,500.00 | 0bps | 30 bps |
| ☐ 2400199974 | 84,500.00 | $84,500.00 | 0bps | 30 bps |
| ☐ 2400206884 | 123,000.00 | $123,000.00 | 0bps | 30 bps |
| ☐ 2400206964 | 54,000.00 | $54,000.00 | 0bps | 30 bps |
| ☐ 2500190875 | 139,997.00 | $139,997.00 | 0bps | 30 bps |
| ☐ 2500205425 | 76,500.00 | $76,500.00 | 0bps | 30 bps |
| ☐ 2500207745 | 240,000.00 | EXCLUDED | 0bps | 30 bps |
| ☐ 2600208116 | 134,000.00 | $134,000.00 | 0pbs | 30 pbs |
| ☐ 2700201227 | 81,000.00 | $81,000.00 | 0bps | 30 bps |
| ☐ 2700203697 | 108,000.00 | $108,000.00 | 0bps | 30 bps |
| ☐ 2700207117 | 124,200.00 | $124,200.00 | 0bps | 30 bps |
| ☐ 2800202468 | 70,000.00 | $70,000.00 | 0bps | 30 bps |
| ☐ 2800204818 | 171,000.00 | $171,000.00 | 0bps | 30 bps |

SHOWN 1..20 OF 60    <PREV 20 | 1 2 3 | NEXT 20>

FIG. 5a

| HOME | LOAN TO VALUE | LOAN TO SELL | SERVICING | LOAD DATA | PROFILE |

[LOG OUT] [HELP]

CHANGE DEFAULT SERVICING FEE

1. TYPE IN A DEFAULT SERVICING FEE FOR EACH PRODUCT.
2. CLICK ON THE APPLY BUTTON.

| PRODUCT | SERVICE FEE | |
|---|---|---|
| 30 YEAR FIXED | 35 | bps |
| 15 YEAR FIXED | 30 | bps |
| 20 YEAR BALLOON | 30 | bps |
| 7 YEAR BALLOON | 15 | bps |
| 3 YEAR ARM | 25 | bps |
| 5 YEAR ARM | 25 | bps |
| 7 YEAR ARM | 25 | bps |
| 10 YEAR ARM | 25 | bps |

[APPLY]  [RESET]  [CANCEL]

FIG. 5b

LOANS TO VALUE

TRANSACTION STATUS: SPOT PRICED BY ABCD AS OF OCT-30-1901 2:47 PM
LAST MODIFIED: BY ABCD ON OCT-30-1901 2:47 PM

UNSOLD LOANS: 112
LOANS THAT CANNOT BE PRICED: 4
LOANS EXCLUDED: 3
TOTAL LOAN AMOUNT: $25,842,609.00
WEIGHTED AVERAGE SERVICING: 33.5bps
WEIGHTED AVERAGE MARKET PRICE: 101.6

- IMPORT LOANS
- VIEW LOANS
- EDIT LOANS
- CHANGE SERVICING
- MARK TO MARKET

- EXPORT LOAN DEATAILS

[ CREATE LOAN LATER ]

FIG. 6

PRICE SUMMARY
TRANSACTION STATUS: SPOT PRICED BY ABCD AS OF OCT-30-1901 2:54 PM
LAST MODIFIED: BY ABCD ON OCT-30-1901 2:54PM

UNSOLD LOANS: 112
LOANS THAT CANNOT BE PRICED: 2
LOANS EXCLUDED: 3
TOTAL LOAN AMOUNT: $25,842,609.00
WEIGHTED AVERAGE SERVICING: 33.5 bps
WEIGHTED AVERAGE MARKET PRICE: 101.06

- IMPORT LOANS
- EDIT LOANS
- CHANGE SERVICING
- MARK TO MARKET
- PRINT
- EXPORT LOAN DETAILS

LOAN DETAIL

| 30 YEAR FIXED | 15 YEAR FIXED | 7 YEAR BALLOON

LOANS SUCCESSFULLY PRICED: 60
LOANS NOT PRICED: 2
LOANS EXCUDED: 3
REMITTANCE TYPE: SCHEDULED /SCHEDULED
TOTAL LOAN AMOUNT: $4,345,927.73

WEIGHTED AVERAGE SERVICING: 31.7bps
WEIGHTED AVERAGE PTR: 7.269
WEIGHTED AVERAGE PAR
PORTFOLIO YEILD RATE: 6.156
WEIGHTED AVERAGE
NOTE RATE: 7.498
WEIGHTED AVERAGE
MARKET PRICE: 100.8918

FILTER: ALL LOANS ▼    <PREV 20 | 1 2 3 | NEXT 20>

SHOWN: 1..20 OF 60

| ROW | CASEFILE ID | LOAN AMOUNT ($) | LAST SPOT PRICE | DELIVERY RISK BASED ADJUSTMENT RATE (bps) | RETAINED SERVICING (bps) |
|---|---|---|---|---|---|
| 1. | 2000197160 | 110,000.00 | 102.2512 | 0 | 25 |
| 2. | 2000206820 | 59,500.00 | 101.1058 | 0 | 25 |
| 3. | 2000207840 | 229,500.00 | 101.5131 | 0 | 40 |
| 4. | 2100182561 | ERROR: 851110—LOAN ALREADY SOLD TO FANNIE MAE. | | | 35 |
| 5. | 2100202571 | 138,500.00 | 101.6294 | 0 | 30 |
| 6. | 2100205591 | 74,997.00 | 101.9200 | 0 | 30 |
| 7. | 2200197972 | 144,000.00 | 102.9642 | 0 | 30 |

TRANSACTION HISTORY

SHOW TRANSACTIONS FOR THE PAST [5 DAYS ▶]

| TRANSACTION | TIME | LOAN COUNT | LOAN AMOUNT ($) | PRICE | USER ID | STATUS |
|---|---|---|---|---|---|---|
| SELL/FUND | MAR-15-02 5:00PM | 37 | 3,700,000.00 | 99.8237 | G8UACE | COMPLETED |
| SELL/FUND | MAR-15-02 7:54PM | 45 | 4,500,000.00 | 98.6620 | G8UACE | COMPLETED |
| SELL/FUND | MAR-15-02 8:20PM | 47 | 4,700,000.00 | 98.6403 | G8UACE | COMPLETED |
| SELL/FUND | MAR-18-02 12:13PM | 47 | 4,700,000.00 | 99.1238 | G8UACE | COMPLETED |
| SELL/FUND | MAR-19-02 8:37PM | 27 | 2,700,000.00 | 100.2053 | G8UACE | COMPLETED |

• PRINT

FIG. 9

| HOME | LOANS TO VALUE | LOANS TO SELL | SERVICING | LOAD DATA | PROFILE |

[LOG OUT] [HELP]

EDIT LOANS TO SELL

1. TYPE IN NEW SERVICING FEES IN THE RETAINED SERVICING COLUMN.
2. TO EXCLUDE A LOAN FROM FUTURE TRANSACTIONS, UNCHECK ITS ROW.
 • CHANGE SERVICING FEES BY PRODUCT

LOAN DETAIL

| 30 YEAR FIXED | 15 YEAR FIXED | 7 YEAR BALLOON |

FILTER: [ ALL LOANS ▼ ]

SHOWN 1..20 OF 46   <PREV 20 |1 2 3| NEXT 20>

| EXCLUDE CASEFILE ID | LOAN AMOUNT | MOST RECENT SPOT PRICE | DELIVERY BASE ADJUSTMENT RATE | RETAINED SERVICE (bps) | |
|---|---|---|---|---|---|
| ☐ 2000197160 | 110,000.00 | – | – |  | [   ] bps |
| ☐ 2000206820 | 59,500.00 | – | – | bps | |
| ☐ 2000207840 | 229,500.00 | – | – | 40 bps | |
| ☐ 2100182561 | 107,200.00 | – | – | 30 bps | |
| ☐ 2100202571 | 138,500.00 | – | – | 30 bps | |
| ☐ 2100205591 | 74,997.00 | – | – | 30 bps | |
| ☐ 2200197972 | 144,000.00 | – | – | 30 bps | |
| ☐ 2200208202 | 193,500.00 | – | – | 30 bps | |
| ☐ 2400199974 | 84,500.00 | – | – | 30 bps | |
| ☐ 2400206884 | 123,000.00 | – | – | 30 bps | |
| ☐ 2400206964 | 54,000.00 | – | – | 30 bps | |
| ☐ 2500190875 | 139,997.00 | – | – | 30 bps | |
| ☐ 2500205425 | 76,500.00 | – | – | 30 bps | |
| ☐ 2500207745 | 240,000.00 | – | – | 30 bps | |
| ☐ 2600208116 | 134,000.00 | – | – | 30 pbs | |
| ☐ 2700201227 | 81,000.00 | – | – | 30 bps | |
| ☐ 2700203697 | 108,000.00 | – | – | 30 bps | |
| ☐ 2700207117 | 124,200.00 | – | – | 30 bps | |
| ☐ 2800202468 | 70,000.00 | – | – | 30 bps | |
| ☐ 2800204818 | 171,000.00 | – | – | 30 bps | |

SHOWN 1..20 OF 46   <PREV 20 |1 2 3| NEXT 20>

FIG. 11

SUMMARY

TRANSACTION STATUS: SOLD AS OF OCT-30-1901 2:53 PM

LOANS SUCCESSFULLY SOLD: 56

LOANS THAT COULD NOT
BE SOLD: 4

LOANS EXCLUDED: 0

TOTAL LOAN AMOUNT SOLD: $ 25,842,609.00

WEIGHTED AVERAGE
SERVICING: 33.5bps

WEIGHTED AVERAGE
MARKET PRICE: 101.6

LOANS SUCCESSFULLY FUNDED: 56

LOANS THAT COULD NOT
BE FUNDED: 4

TOTAL PURCHASE PRICE: $26,256,090.74

INTEREST: $71,434,409.12

DELIVERY FEE: ($134,412.54)

TOTAL PROCEEDS: $97,556,087.32

- PRINT
- EXPORT LOAN DETAILS

FIG. 12

LOAN DETAIL

| 30 YEAR FIXED | 15 YEAR FIXED | 7 YEAR BALLOON |

LOANS SUCCESSFULLY SOLD: 42

LOANS THAT COULD NOT
BE SOLD: 4

LOANS EXCLUDED: 0

TOTAL LOAN AMOUNT SOLD: $4,345,927.73

REMITTANCE TYPE: SCHEDULED/SCHEDULED

WEIGHTED AVERAGE MARKET PRICE: 100.8918

WEIGHTED AVERAGE PTR: 7.269

WEIGHTED AVERAGE PAR PORTFOLIO
YIELD RATE: 6.156

WEIGHTED AVERAGE NOTE RATE: 7.498

LOANS SUCCESSFULLY FUNDED: 42

LOANS THAT COULD NOT
BE FUNDED: 4

EXPECTED CLOSING DATE: OCT-10-2001

TOTAL LOAN AMOUNT FUNDED: $4,345,927.73

TOTAL PURCHASE PRICE: $5,321,512.56

INTEREST: $16,546,123.09

DELIVERY FEE: ($542,632.04)

TOTAL PROCEEDS: $21,325,003.61

FIG. 13

FILTER: ALL LOANS ▶

SHOWN: 1..20 OF 42   < PREV 20 | NEXT 20 >

| CASEFILE ID | LOAN AMOUNT | SALE PRICE | DELIVERY RISK BASED ADJUSTMENT RATE | RETAINED SERVICING | PURCHASE PRICE | INTEREST | DELIVERY FEE | TOTAL PROCEEDS |
|---|---|---|---|---|---|---|---|---|
| 2000197160 | $110,000.00 | 102.2512 | 37.5bps | 25bps | $112,476.32 | $452,137.19 | ($1,243.95) | $56,342.67 |
| 2000206820 | $59,500.00 | 101.1058 | 25bps | 25bps | $60,157.95 | $452,137.19 | ($838.52) | $56,342.67 |
| 2000207840 | $229,500.00 | 101.5131 | 75bps | 40bps | $232,972.56 | $452,137.19 | ($2,840.24) | $56,342.67 |
| 2100182561 | $107,200.00 | 102.4963 | 0bps | 30bps | $109,876.03 | $452,137.19 | ($0.00) | $56,342.67 |
| 2100202571 | $138,500.00 | 101.6294 | 0bps | 30bps | $140,756.72 | $452,137.19 | ($0.00) | $56,342.67 |

FIG. 14

| HOME | LOAN TO VALUE | LOAN TO SELL | SERVICING | LOAD DATA | PROFILE |

LOG OUT    HELP

TRANSACTION HISTORY

1. USE THE DROP-DOWN LIST TO SELECT A TIME PERIOD FOR VIEWING HISTORY.

2. TO VIEW A TRANSACTION, CLICK ON ITS LINK IN THE TRANSACTION COLUMN.

SHOW TRANSACTIONS FOR THE PAST  24 HOURS ▼

| TRANSACTION | TIME | LOAN COUNT | LOAN AMOUNT | PRICE | USER ID | STATUS |
|---|---|---|---|---|---|---|
| SELL/FUND | OCT-14-01 12:36PM | 11 | $195,346.77 | 99.3242 | SXUNNA | COMPLETED |
| SELL/FUND | OCT-14-01 10:45AM | 86 | $205,449.77 | 100.0200 | SXUNNA | COMPLETED |
| SELL/FUND | OCT-14-01 10:01AM | 4 | $186,345.23 | – | SXUNNA | FAILED |

• PRINT

FIG. 15

| HOME | LOANS TO VALUE | LOANS TO SELL | SERVICING | LOAD DATA | PROFILE |

[LOG OUT]  [HELP]

CHANGE DEFAULT SERVICING FEES

1. TYPE IN A DEFAULT SERVICING FEE FOR EACH PRODUCT.
2. CLICK ON THE APPLY BUTTON.

| PRODUCT | SERVICING FEE | |
|---|---|---|
| 30 YEAR FIXED | 35 | bps |
| 15 YEAR FIXED | 30 | bps |
| 20 YEAR FIXED | 30 | bps |
| 7 YEAR BALLON | 15 | bps |
| 3 YEAR ARM | 25 | bps |
| 5 YEAR ARM | 25 | bps |
| 7 YEAR ARM | 25 | bps |
| 10 YEAR ARM | 25 | bps |

[APPLY]   [RESET]   [CANCEL]

FIG. 16

SYSTEM AND METHOD FOR MORTGAGE LOAN PRICING, SALE AND FUNDING

CROSS-REFERENCE TO RELATED PATENT APPLICATIONS

This application is a continuation-in-part of, and claims priority to U.S. patent application Ser. No. 09/593,106 filed on Jun. 13, 2000, which is incorporated by reference herein in its entirety. Additionally, this application claims the benefit of U.S. Provisional Patent Application No. 60/343,950 filed on Dec. 28, 2001, the disclosure of which is also incorporated by reference herein in its entirety.

BACKGROUND OF THE INVENTION

The present invention relates generally to computerized mortgage qualification, application, approval, underwriting and pricing system and process of a type described in U.S. patent application Ser. No. 09/593,106 assigned to the assignee of the present invention. More particularly, the present invention relates to an improved system and process for determining a "spot price" for a loan (i.e., the price that a lender may expect to receive in the secondary mortgage market when it sells the loan to a secondary mortgage market purchaser). The present invention further relates to facilitating the sale of the loan to the secondary mortgage market purchaser.

When considering the purchase or refinance of a home, potential home buyers consult mortgage lenders such as mortgage companies, savings and loan institutions, banks, credit unions, state and local housing finance agencies or the like to obtain the funds necessary to purchase or refinance their homes. These lenders, who make (originate and fund) mortgage loans directly to home buyers, comprise the "primary mortgage market."

When a mortgage is made in the primary mortgage market, the lender has several options which include: (i) holding the loan as an investment in its portfolio; (ii) selling the loan to investors in the "secondary mortgage market" (which includes government-sponsored entities, pension funds, insurance companies, securities dealers, financial institutions and various other investors) to replenish its supply of funds; or (iii) packaging the loan with other loans and exchanging them for securities like mortgage backed securities which provide lenders with a liquid asset to hold or sell to the secondary market. By choosing to sell its mortgage loans to the secondary mortgage market, or by selling the mortgage backed securities, lenders get a new supply of funds to make more home mortgage loans, thereby assuring home buyers a continual supply of mortgage credit.

A secondary mortgage market purchaser finances the loans and mortgage backed securities it buys for its own mortgage portfolio by the sale of debt securities in the global capital markets. Working with investment banks, the purchaser sells its debt to both domestic and international investors such as central banks, pension funds, investment funds, commercial banks and insurance companies.

It would be advantageous to provide a system and method which may provide lenders with improved capability to prices sell, and receive funding for loans in the secondary mortgage market. It would further be advantageous to provide a system and method to facilitate the pricing or valuation of financial products such as mortgages and loans. It would further be advantageous to provide a system and method to facilitate the sale and funding of financial products such as mortgages and loans. It would further be advantageous to provide a system and method to allow servicing fees of one or more loans to be optimized or otherwise adjusted.

It would be desirable to provide a system and method or the like of a type disclosed in the present application that includes any one or more of these or other advantageous features.

SUMMARY OF THE INVENTION

The present invention relates to a system for optimizing a servicing fee for a set of loans. The system includes a processing unit and a storage device coupled to the processing unit having stored therein information for configuring the processing unit to determine a set of optimal servicing fees for the set of loans.

The present invention also relates to a system for optimizing a servicing fee for a set of loans. The system includes a processing unit and a storage device coupled to the processing unit having stored therein information for configuring the processing unit to obtain a minimum servicing fee and a maximum servicing fee, identify net benefits of increasing servicing fees for the loans in the set of loans, and iteratively adjust the servicing fee until the optimal servicing fee is attained.

The present invention further relates to a method for optimizing a servicing fee for a set of loans. The method includes obtaining a minimum servicing fee, a desired overall average servicing fee, and a maximum servicing fee, identifying net benefits of increasing servicing fees for the loans in the set of loans, and iteratively adjusting the servicing fee until an optimal servicing fee is attained.

The present invention further relates to a system for assigning a servicing fee to a set of loans. The system includes means for obtaining a minimum servicing fee, a desired overall average servicing fee, and a maximum servicing fee, and starting with the minimum fee, means for iteratively adjusting the servicing fee until an optimal servicing fee is attained.

BRIEF DESCRIPTION OF THE DRAWINGS

FIG. 2 is a high-level flow chart depicting a method for determining a price of a loan according to an exemplary embodiment;

FIG. 4 is a user interface for the loan system showing imported loan detail for loans to be valued according to an exemplary embodiment;

FIGS. 5a and 5b are user interfaces for the loan system used to edit loans to be valued and servicing fees according to an exemplary embodiment;

FIG. 6 is a user interface for the loan system showing summary data for loans to be valued according to an exemplary embodiment;

FIG. 7 is a user interface for the loan system showing loan product by remittance type summary data for loans to be valued according to an exemplary embodiment;

FIG. 8 is a user interface for the loan system showing detail data for loans to be valued according to an exemplary embodiment;

FIG. 9 is a user interface for the loan system showing transaction history data for loans to be valued according to an exemplary embodiment;

FIG. 11 is a user interface for the loan system to edit loans to be sold according to an exemplary embodiment;

FIG. 12 is a user interface for the loan system showing summary data for loans to be sold according to an exemplary embodiment;

FIG. 13 is a user interface for the loan system showing loan product by remittance type summary data for loans to be sold according to an exemplary embodiment;

FIG. 14 is a user interface for the loan system showing loan level detail data for loans to be sold according to an exemplary embodiment;

FIG. 15 is a user interface for the loan system showing transaction history data for loans to be sold according to an exemplary embodiment;

FIG. 16 is a graphic showing global or default servicing fees by product according to an exemplary embodiment.

DETAILED DESCRIPTION OF THE PREFERRED EMBODIMENTS

Referring to FIGS. 1 to 17, systems and methods for loan pricing, selling and funding are disclosed that provide lenders with the capability to price (e.g., generate a spot price, value, etc.), sell, and fund loans in the secondary mortgage market. Generally, a spot price is the price that the lender may expect to receive in the secondary mortgage market when it sells the loan to a secondary mortgage market purchaser. The spot price allows the lender to value a loan in the secondary market without committing (i.e., selling) the loan. After the loan is closed, the lender can commit (i.e., sell) the loan to the secondary mortgage market purchaser at a determined price. The lender may commit the loan with a spot commitment (i.e., the lender commits to sell the loan as of the time of commitment) or with a forward commitment (i.e., the lender commits to sell the loan at a future time).

Although discussed in the context of mortgage loans, it should be understood that the systems and methods disclosed are not limited to mortgage loans, but can have application with respect to other types of loans, mortgage products and financial instruments. Additionally, a variety of parties may use the systems and methods disclosed, including conventional lenders, other loan originators, loan servicers in the primary mortgage market, loan purchasers, etc.

Generally, the systems and methods disclosed facilitate the sale of mortgage loans by lenders to secondary mortgage market purchasers. According to various exemplary embodiments, the methods and systems may be provided in real time over the Internet or other computer network. According to various alternative embodiments, the systems and methods may be implemented in a variety of environments, including on a single computer system, intranets, local area networks, communication networks, dial-up services, etc.

The systems and methods may be implemented using a related combination of automated interfaces and manual processes. It should be appreciated, however, that a greater use of automated processing and a wider range of product features with multiple executions and elections may also be used.

Figure 1:
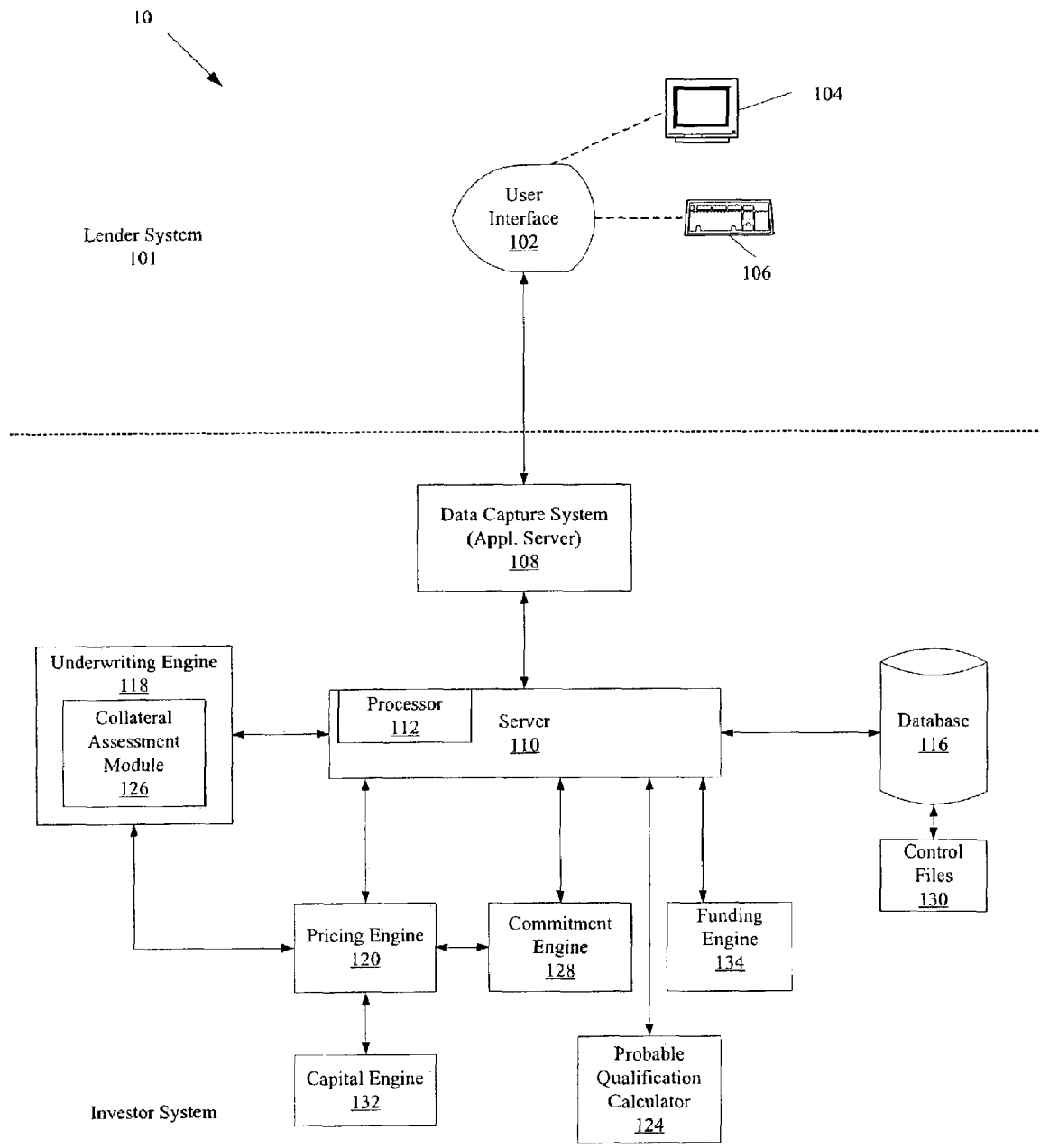
FIG. 1 is a schematic diagram of a loan system for use in pricing, selling, and funding loans according to an exemplary embodiment.

Shown in FIG. 1 is a simplified schematic illustration of a loan system for pricing, selling and funding loans, generally indicated as system 10. System 10 may utilize various computer capabilities, hardware, software, electronic communications links, etc.

System 10 includes a computer server 110 having a processor 112. Server 110 has access (e.g., via electronic communication, data link, wireless communication, etc.) to a database 116 containing control files 130 also known as look up tables. Server 110 operates under the control of computer software. According to one exemplary embodiment, the computer software includes a probable qualification calculator 124, a pricing engine 120, an underwriting engine 118, and a collateral assessment module 126 within the underwriting engine. According to a particularly preferred embodiment, each set of software objects and/or program elements collectively have the ability to execute independently in a separate thread or logical chain of process execution, while permitting the flow of data inputs between various software objects and/or program elements. According to a particularly preferred embodiment, calculator 124, engines 120 and 118 and module 126 are run on a single server 110. According to an alternative embodiment, the calculator, the engines, and the module can each be executed on separate logical servers or using a separate physical devices.

Server 110 is electronically coupled to a remote server 108 on a user side (e.g., lender). Server 108 is coupled to a user system 102 having a user interface including conventional input and display devices. User system 102 is preferably a remote interface coupled to server 108 via a computer network which can be the Internet or a local or wide area dedicated or private network, wireless network, etc. Users of user system 102 may include those personnel of a lender responsible for marketing and selling mortgage loans to secondary mortgage market purchasers or others associated with loan pricing, selling or funding.

According to an exemplary embodiment, system 10 recognizes a distinction between two types of mortgage loan sets. A first set of loans (e.g., loans to be valued), can be valued ("marked-to-market") as often as desired, with the results available until the next mark-to-market activity. The valuation of mortgage loans in the secondary mortgage market is generally referred to as "mark-to-market." The spot price provided is neither a commitment from the lender to sell the loan nor a commitment from the secondary mortgage market participant to purchase the loan. A second set of loans, (e.g., loans to be sold), contains closed loans that the lender can mark-to-market as many times as desired and then sell. The lender is funded for each loan that is successfully committed and priced.

According to a particularly preferred embodiment, the loans to be valued and the loans to be sold may be kept operationally distinct to avoid inadvertent sale and funding of loans that may not actually be available for sale.

As shown in FIG. 2, a process 40 for pricing (e.g. spot pricing) one or more loan products (such as mortgage loans) may be initiated by the lender (step 41). Casefile information (e.g., loan, identifiers, file numbers/names, etc.) is then imported (uploaded) into server 110 from lender server 108 (step 42). According to a particularly preferred embodiment, the uploaded loans are divided into batches (step 44). According to an alternative embodiment, step 44 may be omitted and all loans may be processed together. A mark-to-market request may be created and forwarded to pricing engine 120 (step 46).

Lender may initiate a request for a spot sales price for the loan in the system pipeline at any time after the loan has been rate locked (i.e., the loan will be a specified interest rate provided that the loan is closed within a set period of time) in order to value the individual loan in the secondary mortgage market without selling the loan. According to a particularly preferred embodiment, the loan may not be sold until it is closed.

Upon receiving the mark-to-market request, pricing engine 120 calculates a spot sales price for delivery to the lender (step 48). According to a particularly preferred embodiment, pricing engine 120 calculates a spot sales price in accordance with the methods discussed in copending U.S. patent application Ser. No. 09/593,106, assigned to the assignee of the present application.

Figure 3A:
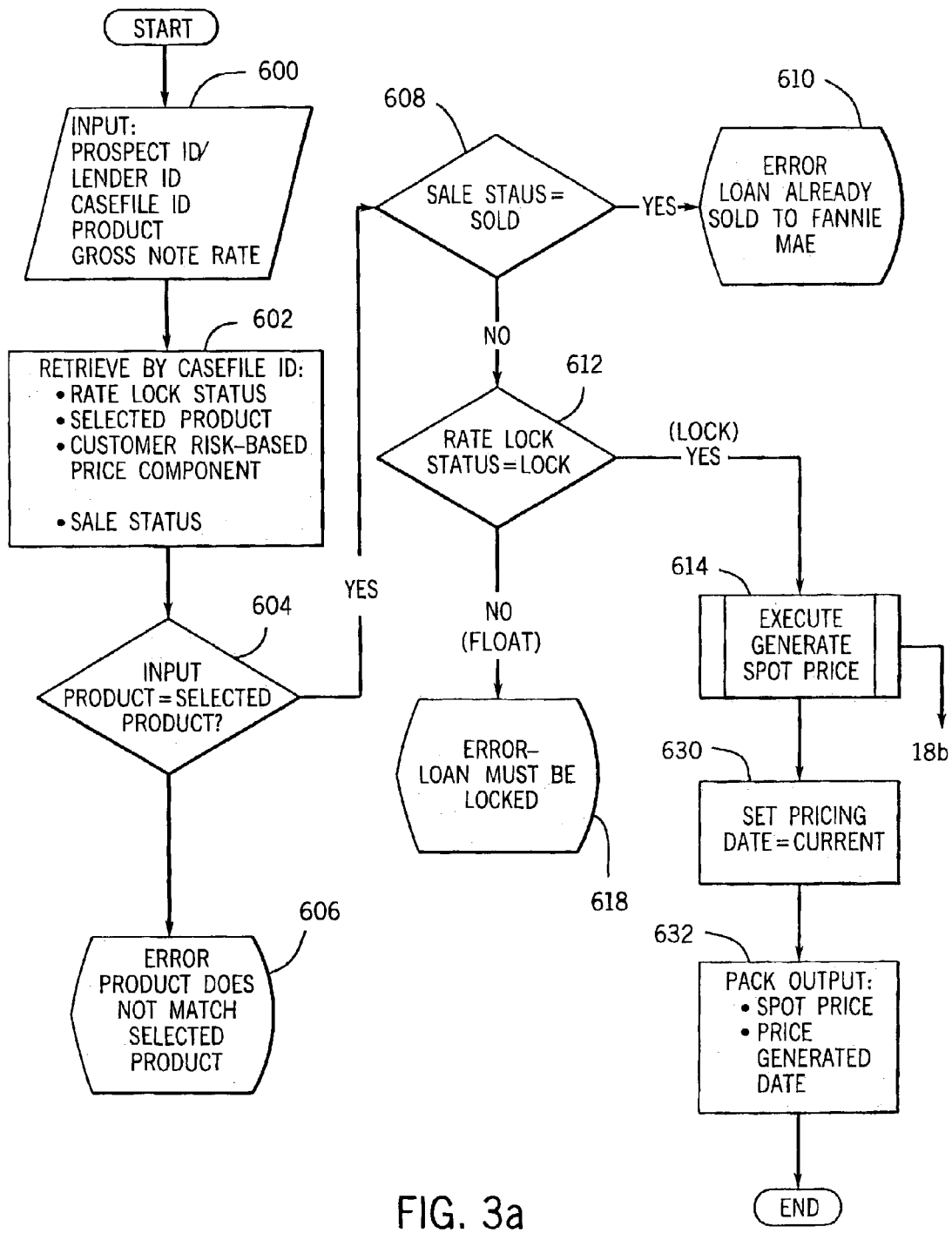
FIGS. 3a and 3b are flow charts depicting a process of generating a price of a loan according to an exemplary embodiment.

Operation of pricing engine 120 is described in greater detail in connection with FIGS. 3a to 3b. As shown in FIG. 3a, the lender provides information to pricing engine 120 including the gross interest rate (step 600). Once the information is provided, information concerning the selected loan product, the rate lock status, the customer risk-based price component, and the sale status may be retrieved by casefile ID (step 602).

Pricing engine 120 verifies that the input product is the selected product (step 604). If not, an error message is generated indicating that the product does not match the selected product and the process terminates (step 606). If the input product is indeed the selected product, the process queries if the loan has been sold (step 608).

If a "yes" response is returned at decision 608, an error message is generated indicating that the loan has already been sold to a secondary mortgage market purchaser (step 610). If a "no" response is given, the process queries if the rate status is lock (step 612).

If the rate status is lock, a spot price is generated as described in greater detail below in connection with FIG. 3b (step 614). If a "no" response is returned at step 612, i.e., if the rate status is not lock (float), an error message is generated indicating that the loan must be locked in order to obtain a spot price (step 618).

Pricing engine 120 generates the spot price utilizing input data including the product, customer risk-based price component, and gross interest rate (step 614).

Figure 3B:
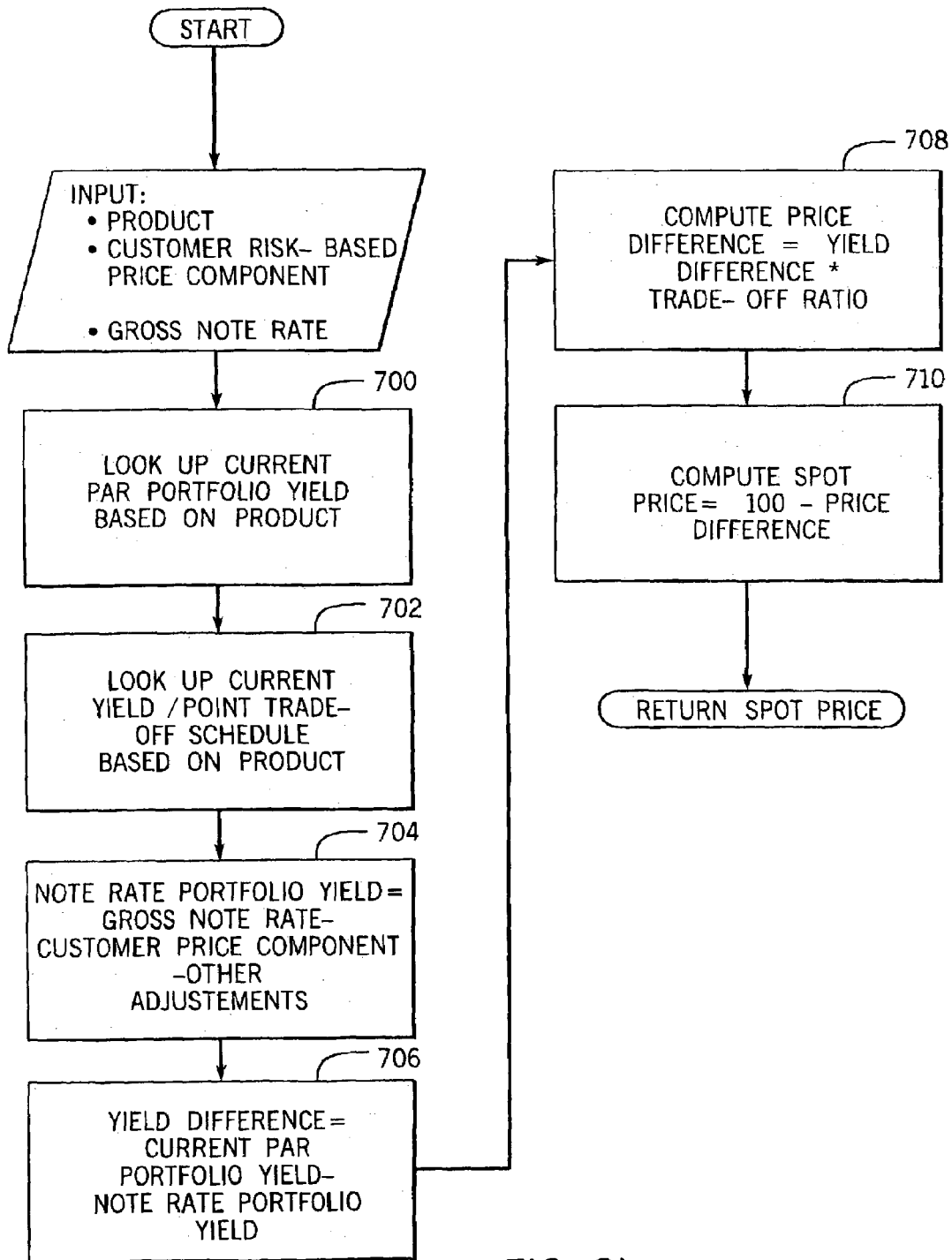

Referring now to FIG. 3b, pricing engine 120 retrieves the current product specific par portfolio yield from a look up table (step 700). Pricing engine 120 then retrieves the current product specific yield/point trade-off schedule (step 702).

Pricing engine 120 calculates the interest rate portfolio yield as the gross interest rate less the customer risk-based price component less other appropriate adjustments (step 704). Pricing engine 120 calculates the yield difference as the current par portfolio yield less the interest rate portfolio yield (step 706). Pricing engine 120 calculates the price difference as the yield difference multiplied by an appropriate trade-off ratio (i.e., what is paid in price for one basis point in yield) (step 708). Then, the spot price is calculated as 100 minus the price difference (step 710).

Referring back to FIG. 3a, with the spot price calculated, pricing engine 120 sets the pricing date equal to the current date (step 630) and packages the spot price and the current date as output (step 632).

Referring back to FIG. 2, once the spot price is determined, the spot price and casefile information can be stored in database 116 (step 49). At steps 50 and 52, the spot price is also delivered to the lender together with the current par portfolio yield (i.e., the required yield in effect at that time). The process ends at step 54.

In importing loans, system 10 may accept delimited files with a header record, so that the fields within the file can appear in any order. Data fields associated with a loan to be spot priced (marked-to-market) can include casefile ID (assigned by the secondary mortgage market purchaser), lender loan ID (assigned by the lender), amortization type (e.g., adjustable rate or fixed rate), amortization term (e.g., 1-360 months), balloon indicator and term (if any), remittance type (e.g., actual/actual, scheduled/scheduled, scheduled/actual, etc.), loan amount, gross note rate, points paid, scheduled closing date for the loan and retained servicing fee (described in greater detail below). Data fields associated with a marked-to-market loan can further include the spot price, current par portfolio yield, date/time stamp, customer price component rate (the value of the various risk factors added to par portfolio yield to determine a borrower's first lien interest rate), low down payment price adjustment rate (the value in yield assessed on loans with a loan-to-value greater than 80%), delivery risk-based adjustment rate (preferably included in the spot price and assessed at the time of delivery), loan sale status (i.e., sold, spot priced, not spot priced), and casefile error code and message.

According to a particularly preferred embodiment, uploaded files can remain in the system until other uploads of the same type (e.g., the loans to be valued or loans to be sold) replace them. The results of mark-to-market requests for both the loans to be valued and loans to be sold are generally stored and available for download only until another loan set is run. According to an alternative embodiment, the results of mark-to-market requests may be stored indefinitely, or for a variety of other defined time periods. When a loan set is successfully imported, the number of loans imported can be displayed.

Loans containing errors (e.g., loans that have invalid data, loans that cannot be priced because they were already sold, loans that have not been rate locked, etc.) will preferably not be imported or displayed. Desirably, the user can opt to continue to process importing loans and skip any loans in error, or cancel importing loans altogether.

During the import process (i.e., importing loans into the system), data validations are preferably performed, including for (i) data type, (ii) field size, (iii) date format, (iv) mandatory data and (v) data values for coded fields. If a loan fails any of these validations, the loan will be considered in error.

When importing a loan set, any number of loans having mixed product and remittance types within the loan set may be imported. Additionally, system 10 may indicate (e.g., via a transaction status bar) that an import occurred, the user who performed the import, and the date and time of the import.

According to one exemplary embodiment, the system may provide detail information for the loans by product. Following a loan set import for the loans to be valued, the loan set can be parsed and each loan placed into a corresponding tab based on product and remittance type. Desirably, within each tab the loan detail can be viewed by (i) casefile ID, (ii) lender loan ID, (iii) note rate, (iv) loan amount and (v) retained servicing fee.

In the example user interface shown in FIG. 4, the input file is divided into three tabs (one for each sample product type of 30 Year Fixed Rate Mortgage (FRM), 15 Year FRM and 7 Year Balloon). The user can toggle between the tabs to view the loan details that were uploaded.

Once a loan set has been imported, it may be edited. Any selected loan may be excluded from being priced and/or a retained servicing fee for a loan may be changed. Any loan excluded will not be priced. If a retained servicing fee is changed, the new fee will preferably be used in computing the spot price the next time a mark-to-market for the loan is requested.

For example, referring to FIG. 5a, the user can delete loans from the loans to be valued set uploaded via the Loan Details user interface of the preferred embodiment of the system according to the present invention, for example, by marking a check box (e.g., "Exclude") and then selecting a "Save Changes" action or the like. The user can also opt to change the retained servicing fee by selecting a "Change Servicing Fees by Product" action or the like. Referring to FIG. 5b, the user can then make appropriate edits to the fee. As described in greater detail hereinafter, if no servicing fee is or has been affirmatively entered, a preselected default fee can be utilized.

Following the mark-to-market process described above and depicted in FIG. 2, a loan set summary, product by remittance type summary and loan level detail are preferably displayed.

Referring to FIG. 6, which depicts an example user interface for presenting loan set summary information, the following data for all loans priced may be presented: (i) number of loans successfully imported, (ii) number of loans successfully marked (spot priced), (iii) total loan amount, (iv) weighted average market price (the weighted average value of the price for successfully processed loans) and (v) weighted average servicing (the weighted average value of the retained servicing for successfully processed loans). For loans that were not successfully priced (e.g., due to an error on validation or because the loan was already sold) but were not excluded, the total number of loans not priced can be displayed. Also, if the user excluded any loans from the loan set, the number of loans excluded may be displayed.

To calculate the weighted average market price, the spot price for each loan in a set of loans is multiplied by the associated unpaid principal balance (UPB) first lien loan amount and the results are added. This result is then weighted by dividing by the total UPB. An example calculation of weighted average market price is set forth below as Example 1.

Example 1

Weighted Average Market Price Calculation

A batch of three loans is to be spot priced.
Loan 1's spot price is 101.00 and its UPB is $50,000.00
Loan 2's spot price is 101.00 and its UPB is $100,000.00
Loan 3's spot price is 100.00 and its UPB is $75,000.00.
The weighted average purchase price is 100.6667.
The calculation:

| | | |
|---|---|---|
| 101.00 * | $50,000.00 = | $5,050,000.00 |
| 101.00 * | $100,000.00 = | $10,100,000.00 |
| 100.00 * | $75,000.00 = | $7,500,000.00 |
| | $225,000.00 | $22,650,000.00 |
| $22,650,000.00/$225,000.00 = 100.6667 | | |

Referring to FIG. 7, which depicts an example user interface for presenting product by remittance type summary information, the following aggregated data may be presented: (i) weighted average par yield (the weighted average value of the par yield for successfully processed loans), (ii) weighted average pass through rate (the weighted average value of the pass through rate—first lien interest rate less retained servicing fee—for successfully processed loans) and (iii) weighted average note rate (the weighted average value of the first lien interest rates for successfully processed loans).

To calculate the weighted average note rate, the first lien interest rate for each loan in a set of loans is multiplied by the associated UPB first lien loan amount and the results are added. This result is then divided by the total UPB. An example calculation of weighted average note rate is set forth below as Example 2.

Example 2

Weighted Average Note Rate Calculation

A batch of three loans is to be spot priced.
Loan 1's Interest Rate is 8% and UPB is $50,000.00
Loan 2's interest rate is 5% and UPB is $100,000.00
Loan 3's interest rate is 7% and UPB is $75,000.00
The weighted average note rate for the batch is 6.333.
The calculation:

| | | |
|---|---|---|
| 8.00 * | $50,000.00 = | $400,000.00 |
| 5.00 * | $100,000.00 = | $500,000.00 |
| 7.00 * | $75,000.00 = | $525,000.00 |
| | $225,000.00 | $1,425,000.00 |
| $1,425,000.00/$225,000.00 = 6.333 | | |

To calculate the weighted average pass through rate, the pass through (first lien interest rate–servicing fee) for each loan in a set of loans is multiplied by the first lien loan amount. These results are then added. This total is then weighted by dividing by the total UPB. An example calculation of weighted average pass through rate is set forth below as Example 3.

Example 3

Weighted Average Pass Through Rate (PTR) Calculation

A batch of three loans is to be spot priced.
Loan 1's Interest Rate is 8% and UPB is $50,000.00
Loan 2's interest rate is 5% and UPB is $100,000.00
Loan 3's interest rate is 7% and UPB is $75,000.00.
The lender chose to retain 25 basis points of servicing on each of these loans. The weighted average pass through rate is 6.083.
The calculation:

| | | |
|---|---|---|
| 8.00 − 0.25 = 7.75 * | $50,000.00 = | $387,500.00 |
| 5.00 − 0.25 = 4.75 * | $100,000.00 = | $475,000.00 |
| 7.00 − 0.25 = 6.75 * | $75,000.00 = | $506,250.00 |
| | $225,000.00 | $1,368,750.00 |
| $1,368,750.00/$225,000.00 = 6.083 | | |

With respect to mark-to-market loan level detail results, the following data may be presented: (i) casefile ID, (ii) lender loan ID, (iii) note rate, (iv) loan amount, (v) last spot price, (vi) delivery risk based adjustment rate, and (vii) retained servicing fee. Referring to the example user interface shown in FIG. 8, mark-to-market loan level detail results may be displayed in generally the same manner as detail information following a loan set import as shown in FIG. 4 (e.g., tabs per product), except that the summary information returned from multiple batches of the same product/remittance type may appear only once per tab.

Any loan that was excluded by the lender or in error can also be displayed in the loan level detail. An excluded loan may be denoted as such and may contain an identification of the user who excluded the loan. A loan in error can be denoted with an error message describing why the loan could not be priced.

Upon accessing system 10, a user is preferably presented with the results from the last transaction submitted, be it two minutes or two months ago. For example, if a lender submitted a mark-to-market transaction that included 7 Year Balloons, 15 Year FRMs, and 20 Year FRMs, and then exited the system, when the lender next logs in, the lender may be presented with the results from that mark-to-market transaction.

A transaction history can be provided for a user-specified period of time to define the state of the loan data in system 10. An example transaction history user interface is shown in FIG. 9.

Following the completion of a mark-to-market request, the lender can print the results (summary and loan detail) and/or export the results (summary and loan detail). The user can use the resulting data set to update its internal systems. The results of the mark-to-market process can be available for export on demand until another transaction (mark-to-market or sell/fund) is run.

Figure 10:
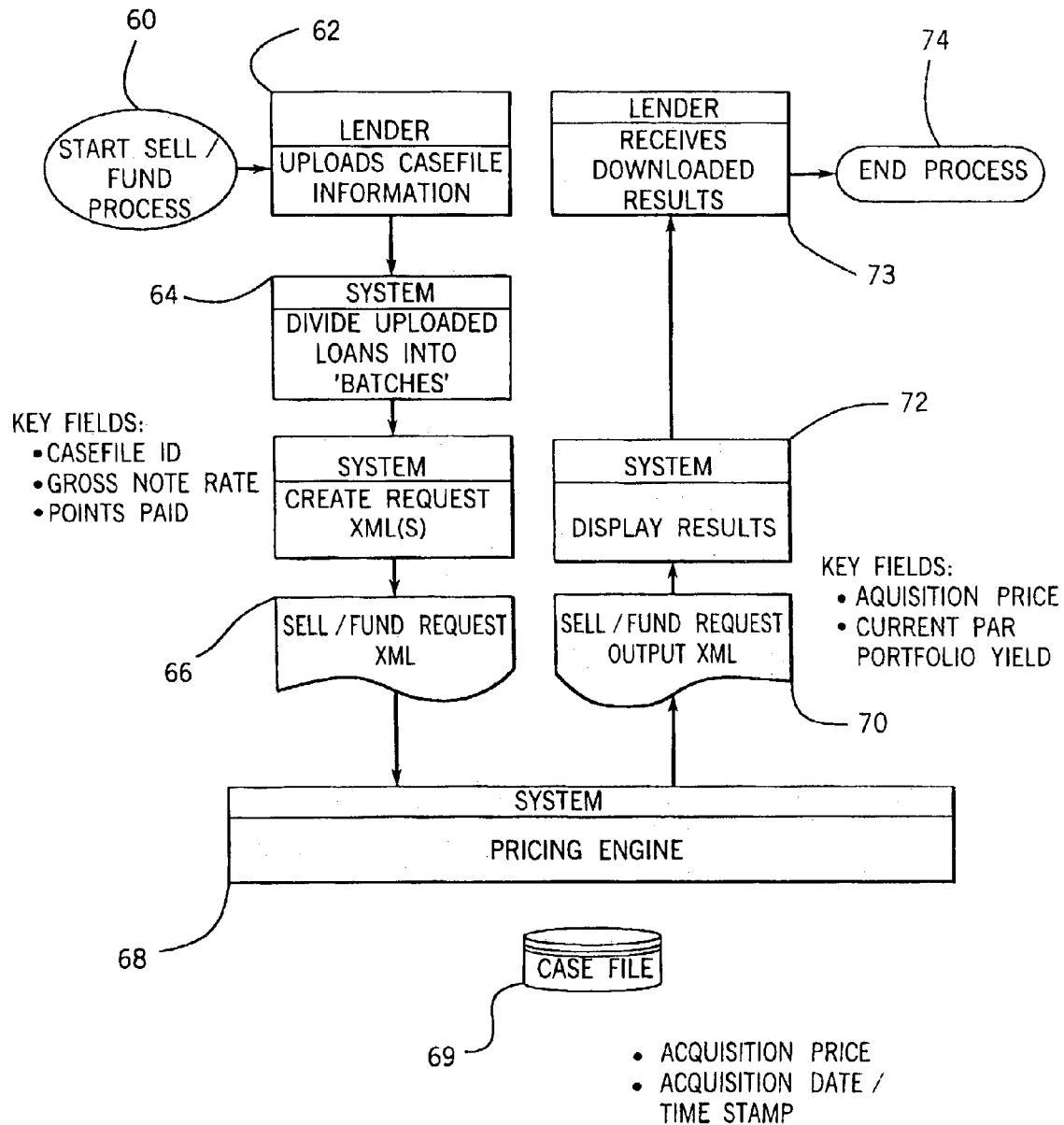
FIG. 10 is a high-level flow chart depicting a selling and funding process for loans according to an exemplary embodiment.

A process for selling and funding a loan according to a preferred embodiment (referred to as "sell/fund process") is shown in FIG. 10. Referring to FIG. 10, the lender initiates the sell/fund process at step 60. Casefile information (i.e., for the loans to be sold) is then imported (uploaded) into server 110 from lender server 108 (step 62). According to a particularly preferred embodiment, the imported loan set (the loans to be sold) is preferably kept separate from any mark-to-market loan set (the loans to be valued) to avoid the inadvertent sale and funding of loans that are actually not available for sale.

The uploaded loans are divided into batches at step 64. Thereafter, a sell/fund request is created (step 66) and forwarded to pricing engine 120.

Upon receiving the sell/fund request, pricing engine 120 calculates an acquisition (spot) price for delivery to the lender (step 68) in accordance with the method discussed above in connection with the loans to be valued and represented in FIGS. 3a and 3b. That is, the lender can mark-to-market the loans to be sold loan set without committing to sell as described above in connection with the loans to be valued.

Referring back to FIG. 10, once the acquisition price is determined, it is stored in database 116 together with the casefile information (step 69). At steps 70 and 72, the acquisition price is delivered to the lender together with the current par portfolio yield. The lender is funded (total proceeds) for each loan that is successfully committed and priced at the time of sale to the secondary mortgage market purchaser (step 73). It should be noted that the amount of funding may vary slightly from the acquisition price due to various fees and adjustments that may be added to or subtracted from the purchase price.

The capital engine 132 (FIG. 1) may be used to generate capital for funding the loans. The capital engine 132 preferably includes software tools. The capital engine 132 preferably generates capital by, responsive to user inputs, structuring and creating debt securities and other financial instruments, managing the risk (e.g., interest rate risk, credit risk, prepayment risk) associated with such instruments, and facilitating the sale of such financial instruments in the global capital markets.

Thereafter, loan documents executed by the borrower(s) for each of the loans and establishing a right to receive payments from the borrower and other loan terms are delivered to the purchaser. The loans that are sold are thus funded based on the spot commitment of the loans, prior to the purchaser receiving the loan documents associated with the sold loans. The selling of the loans by the lender is a commitment by the lender to deliver the loan documents and, in return for that commitment, the lender is funded prior to delivering the loan documents. The sell/fund process ends at step 74.

As with a mark-to-market loan set import (loans to be valued) discussed above, the loans to be sold import can accept delimited files with a header record, so that the fields within the file can appear in any order. Data fields associated with a loan to be sold and funded can include casefile ID, lender loan ID, amortization type (e.g., adjustable rate or fixed rate), amortization term (e.g., 1-360 months), balloon indicator and term (if any), remittance type, loan amount, gross note rate, points paid, scheduled closing date for the loan, retained servicing fee, loan property type (e.g., condominium), loan-to-value ratio (i.e., the ratio between the first lien loan amount and the lesser of the sales price or the appraised value for the property), current UPB (the amount of loan principal being sold), principal and interest amount (scheduled payment consisting of interest accrued and a portion of principal that will fully repay the loan over the amortization term), first payment date (date the first principal and interest payment is due to the lender by the borrower), last paid installment date (date of the last principal and interest payment paid by the borrower and received by the lender), and mortgage note date (date of the promissory note secured by the mortgage). Data fields associated with a loan that has been priced for sale can further include a casefile transaction status (sold/funded or error), the spot price, current par portfolio yield, pricing date/time stamp, customer price component rate (credit adjustments applied to the loan), low down payment price adjustment rate, delivery risk-based adjustment rate and amount, loan sale status (sold, spot priced, not spot priced), funding request date, expected funding date (date on which funds will be remitted to the lender), days of interest due, principal purchased amount (dollar value of the outstanding mortgage principal being purchased), interest due amount (dollar value of the interest being purchased—if the value is positive, it represents interest owed the lender; if the value is negative, it represents interest the lender owes the secondary mortgage market purchaser), premium discount amount (dollar value of the deviation from par that is being paid for the loan sold), total proceeds (net amount being remitted to the lender for the mortgage purchased—the sum of the principal purchased amount, interest due and premium/discount amount less any delivery risk-based adjustment), and casefile error code and message.

According to a particularly preferred embodiment, imported files can remain in the system until another loan set of loans to be sold is imported. The results of loan sales are preferably stored and available for download for a preselected period of time after their run date. According to an alternative embodiment, the results of loan sales may be stored indefinitely, or for a variety of other defined time periods.

When a loan set is successfully imported, the number of loans imported can be displayed.

Loans containing errors (e.g., loans that have invalid data, loans that cannot be priced or sold because they have already been sold, loans that have not closed, loans that cannot be funded because they have not been sold or they have already been funded) will preferably not be imported or displayed. According to a particularly preferred embodiment, the user can opt to continue to process an import and skip any loans in error, or cancel the import altogether.

During the import process, data validations may be performed, including for (i) data type, (ii) field size, (iii) date format, (iv) mandatory data and (v) data values for coded fields. If a loan fails any one or more of these validations, the loan will be considered in error.

As with an import for the loans to be valued (mark-to-market), an import of the loans to be sold can accept a file of any number of loans of any product and remittance type. Additionally, the system can indicate (e.g., via a transaction status bar) that an import occurred, the user who performed the import and the date and time.

System 10 preferably shows detail information for the loans by product. As with the import for the loans to be valued (FIG. 4), following the loans to be sold loan set import, the loan set is preferably parsed and each loan placed into a corresponding tab based on product and remittance type. Desirably, within each tab the loan detail can be viewed by (i) casefile ID, (ii) lender loan ID, (iii) note rate, (iv) loan amount and (v) retained servicing fee.

Once a loan set has been imported, it can be edited. The user may exclude any loan from being priced and/or change a loan's retained servicing fee. According to a particularly preferred embodiment, any loan which has been excluded will not be priced. Referring to FIG. 11, a user can delete loans from the loans to be sold loan set uploaded via the Loan Details user interface.

Changes to the retained servicing fee for the loans to be sold can be made in much the same manner as with the loans to be valued using a user interface of the type shown in FIG. 5b. If no servicing fee is or has been affirmatively entered, a preselected default fee can be utilized.

According to a particularly preferred embodiment, system 10 will warn the lender if the submission of a sell/fund request is past a preselected funding cut-off, and allow the lender to refrain from continuing with the transaction. The lender then can mark-to-market the loans to be sold loan set. It should be appreciated that this process can work the same as the loans to be valued mark-to-market function described above.

Upon completion of a sell/fund transaction, results are displayed in much the same manner (tabs per product) as those generated in a mark-to-market transaction. Desirably, a loan set summary, product by remittance type summary and loan level detail are displayed following a successful sell/fund transaction.

Referring now to FIG. 12, which depicts an example user interface for presenting loan set summary information, the following data aggregated for all loans successfully priced, sold and funded is preferably presented: (i) number of loans successfully sold, (ii) number of loans successfully funded, (iii) total loan amount, (iv) weighted average sales price (the weighted average value of the price paid by the secondary mortgage market purchaser for successfully processed loans expressed in dollars and as a percentage), (v) weighted average servicing, (vi) total interest due (total dollar value of interest being purchased for all loans successfully processed), (vii) total delivery fee, and (viii) total proceeds (total amount being remitted to the lender). For loans that were not successfully priced but were not excluded, the total number of loans not priced can be displayed. Also, if the user excluded any loans from the loan set, the number of loans excluded can be displayed.

Referring now to FIG. 13, which depicts an example user interface for presenting the loans to be sold product by remittance type summary information, the following aggregated data is preferably presented: (i) weighted average par yield, (ii) weighted average pass through rate, and (iii) weighted average note rate. It should be understood that the foregoing data can be computed as described above in connection with the loans to be valued.

Referring now to the example user interface depicted in FIG. 14, with respect to loan level detail results for a sell/fund transaction, the following data is preferably presented: (i) casefile ID, (ii) lender loan ID, (iii) note rate, (iv) loan amount, (v) sale price, (vi) delivery risk based adjustment rate, (vii) retained servicing fee, (viii) purchase price, (ix) interest due, (x) delivery fee, and (xi) total proceeds. Any loan that was excluded by the lender or in error can also be displayed in the loan level detail. An excluded loan can be denoted as such and can contain an identification of the user who excluded the loan. A loan in error can be denoted with an error message describing why the loan could not be priced or sold.

A sell/fund transaction history can be provided for a user-specified period of time. An example transaction history user interface is depicted in FIG. 15.

Following the completion of a sell/fund transaction, the results can be printed and exported in both summary and loan detail form. Sales transaction data can be available for download on demand for a preselected period of time from the run date. Loans in error or excluded are preferably not included in the download file.

System 10 may provide the capability to set a loan's retained servicing fee at the time of mark-to-market or sale to the secondary mortgage market purchaser. This can be accomplished through (i) a default retained servicing grid, (ii) a change servicing fee link, (iii) an edit loan-function and (iv) importing a loan with the appropriate servicing fee set at the time of import.

"Retained Servicing" is the number of basis points (bps) the loan servicer keeps upon sale of a loan to the secondary mortgage market purchaser. For example, if a lender originates a loan at 8% and keeps 50 bps for servicing on that loan, the pass through to the secondary mortgage market purchaser will be 7.5% because of the 50 bps of "Retained Servicing."

System 10 may permit the establishment of global or default servicing fees by product. These fees can be stored by lender in database 116 and presented in a table or grid for each lender such as depicted in FIG. 16. Preferably, the last change to the servicing fee grid is what is used on mark-to-market and sell/fund requests.

For both the loans to be valued and the loans to be sold, the user can change the default retained servicing fee for a specific request. The user may be presented with the default servicing fee grid as a starting point. The user can then modify any of the product fees. According to a particularly preferred embodiment, changes made to the grid is effective for only the loan set to which it is applied, and the next loan set imported will revert to the default fees.

A user can also modify the retained servicing at the loan level detail via the edit loans function (see FIGS. 5a and 11, for example).

The desired retained servicing fee can also be set at the time of loan set import. The user can establish a loan's servicing fee within the retained servicing data element of the import. This imported fee can be used when pricing the loan.

According to an exemplary embodiment, a servicing fee is specified in the imported loan data, and no other servicing changes are made, it takes priority over the default servicing fee for the same product in the retained servicing fee grid. If the data file has no retained servicing fee element, and no other servicing changes are made, the servicing fee stored in the default retained servicing fee grid is preferably used. If a servicing fee is specified in the imported loan data, and a change is made to the servicing fee, the new values set will preferably be used.

An error message may be returned for retained servicing fees submitted outside of preselected tolerances (for example, 15-50 bps).

Retained servicing is preferably locked upon successful completion of a sell/fund request.

According to an exemplary embodiment, system 10 allows for adding new users, emailing users a new password, and allows for the secondary mortgage market purchaser to submit transactions for a lender.

According to an alternative embodiment, system 10 may accept a set of loans from a lender and assign to each a servicing fee that is optimal in terms of how the lender values servicing fees and how the secondary mortgage market purchaser prices yield variations from par.

According to a particularly preferred embodiment, the lender specifies a desired overall average servicing fee, a minimum fee for any one loan, and a maximum fee for any one loan. The lender also may provide, for each product, a schedule of marginal servicer multiples for different ranges of the lender's choice of two variables. If the lender chooses the servicing fee itself as one of the variables that determine the value of the multiple, the multiple should decline as the servicing fee increases.

Inputs from the secondary mortgage market purchaser preferably include a point/yield trade-off schedule, the current par yield, and a table of minimum fee levels for different credit scores (e.g., FICO) and loan-to-value (the secondary mortgage market purchaser typically desires higher minimums for riskier loans).

Preferably, all loans start with the minimum servicing fee and then the marginal net benefit of increasing the servicing fee by one basis point (MNBS) is determined for each loan. The servicing fee for loans with the highest MNBS are desirably increased first. While increasing fees one loan at a time, system 10 can track (i) the overall average servicing fee (so that the process can be halted when the desired average fee is reached), (ii) the current loan's servicing fee level (so that it will not be allowed to exceed a preselected maximum permissible fee), and (iii) the current loan's MNBS value, which will tend to decline as the servicing fee is increased.

Until the desired overall average fee is reached, the process can continually take the loan with the next highest MNBS and increase its fee until it reaches its maximum fee or its MNBS declines. In this way, all of the discretionary aspects of the fee can be applied to the loans so as to give the lender the most benefit.

The MNBS can have two components. One component is the marginal value to the lender of an additional point of servicing fee (MVS), which can be obtained directly from the lender's schedule of marginal servicer multiples. The other component of MNBS is the marginal cost to the lender of an additional point of servicing fee in terms of what the secondary mortgage market purchaser will pay for the loan if its rate is reduced by one basis point (MCS). The MCS can be read directly from the secondary mortgage market purchaser's point/yield trade-off schedule. MNBS is equal to MVS less MCS.

For each loan, system 10 may begin by using a loan's interest rate before taking out the servicing fee component (rate with zero servicing) plus the minimum servicing fee to determine the loan's initial MCS. If all loans use the same schedule of marginal servicer multiples, the initial MVS can be the same for all loans. It should be understood that, for all loans, the level of MNBS determined is its maximum possible value of MNBS, because as the servicing fee is increased from its minimum level, the MVS will tend to decline while the MCS can only increase.

The overall maximum MNBS among all the loans may be determined, and then a list of all possible lower values of MNBS (the set derived from all possible combinations of the elements of the secondary mortgage market purchaser's schedule and the lender's schedules) may be created. Loans with the highest MNBS are the ones where the lender can derive the most benefit from increasing the servicing fee. Accordingly, it is desirable to first increase the fees on these loans, continuing until each loan (in the subset of loans that have the initial maximum MNBS value) has either reached its preselected maximum servicing fee or has seen its MNBS decline to a lower level. The process can iteratively continue with the next lower value on the list of possible MNBS values.

Desirably, a stopping mechanism is provided that is based on the desired overall average fee that the user has provided. The system can determine how much unpaid principal balance points (UPBP) fees can be increased. The available UPBP is initially equal to the total UPB of the set of loans multiplied by the difference between the desired average fee and the minimum fee level. After each loan has its fee increased as described above, the system can reduce the UPBP available by that loan's UPB multiplied by the amount its fee was increased. Preferably, the inventive method and system determines if UPBP>0. If it is, the process continues; otherwise the process terminates.

Described below is an example of a tool (e.g., system or method) for assigning an optimal servicing fee to a set of loans. The servicing fee is optimized in terms of how the lender values servicing fees and how the loan purchaser prices yield variations from par.

The tool begins by calculating, for each loan, the value of MNBS at the minimum servicing fee, and then determines the next higher fee level where the value of the MNBS would change (either because, as the servicing fee level is being increased, a point is identified where the MCS changes or a point is identified where the MVS changes). The tool records this initial MNBS value and the servicing fee range over which it applies as the first entry on this loan's "MNBS/fee-range" schedule. Then, the tool determines the next value of MNBS and the fee range over which it applies, and the process repeats. According to a particularly preferred embodiment, each loan has an MNBS/fee-range schedule which covers the entire range from the minimum servicing fee to the maximum, and shows the different MNBS values that occur and the specific servicing-fee ranges over which each of these values occurs.

The tool then examines the MNBS/fee-range schedules of all the loans and increases servicing fees on loans where the MNBS from doing so is greatest. This process continues until the target average servicing fee level is reached.

If the MNBS values in the MNBS/fee-range schedule are not in order from high to low, an extra step may be used before starting to increment the loans' servicing fees. This situation can arise because sometimes the yield/point tradeoff schedule is not monotonic; usually MCSs are higher at lower levels of YIELD (e.g., a loan purchaser may place more value on an additional basis point of yield when the yield level is relatively low). A non-monotonic yield/point tradeoff schedule will cause the MNBS schedule to also be non-monotonic. As a result some loans may have higher MNBS values lower down in their MNBS/fee-range schedules, and if the tool were to just examine loans for the next most profitable one to increase servicing fee fore, the tool may fail to select loans where the bigger gains from increasing servicing occur lower down in the MNBS/fee-range schedules.

The tool handles the possible non-monotonicity of the MNBS/fee-range schedules by putting each non-monotonic schedule through a process which combines certain servicing-fee ranges and associates each new, larger range with the average MNBS that would apply over that larger range. In this way, for each loan, the MNBS/fee-range schedule shows the maximum possible average MNBS gain that can be achieved by increasing the servicing fee from any given starting point. Then, the loans' MNBS/fee-range schedules may be reviewed and the fee on the loan with the next highest average MNBS may be incremented, and the process is repeated until the target overall average servicing fee is reached.

Example 1: Assume one product, for which par=5.0% and for which the yield/point tradeoff schedule shows:

| Premium | MCS |
|---|---|
| >=0.25 | 2.5 |
| 0 to <0.25 | 3.5 |
| <0 | 4.5 |

For lender data, suppose the MVS schedule is

| Servicing fee | MVS |
|---|---|
| <=25 bps | 6 |
| >25 bps | 4 |

The lender has a target average fee of 30 bps with a minimum of 15 and a max of 50. There are 3 loans for which fees are to be assigned:

| Loan | UPB | Yield if servicing = 0 |
|---|---|---|
| A | 20 | 5.6 |
| B | 40 | 5.3 |
| C | 40 | 5.1 |

At the minimum fee of 15 bps, the tool will calculate:

| Loan | UPB | Yield if Servicing = 15 | MVS | MCS | MNBS (=MVS − MCS) |
|---|---|---|---|---|---|
| A | 20 | 5.45 | 6 | 2.5 | 3.5 |
| B | 40 | 5.15 | 6 | 3.5 | 2.5 |
| C | 40 | 4.95 | 6 | 4.5 | 1.5 | and the MNBS/fee-range schedules:

| Loan | Fee Range | MVS | MCS | MNBS (=MVS − MCS) |
|---|---|---|---|---|
| A | 15-25 | 6 | 2.5 | 3.5 |
|   | 25-35 | 4 | 2.5 | 1.5 |
|   | 35-50 | 4 | 3.5 | 0.5 |
| B | 15-25 | 6 | 3.5 | 2.5 |
|   | 25-30 | 4 | 3.5 | 0.5 |
|   | 30-50 | 4 | 4.5 | −0.5 |
| C | 15-25 | 6 | 4.5 | 1.5 |
|   | 25-50 | 4 | 4.5 | −0.5 |

The MNBS/fee-range schedules are already monotonically decreasing, therefore, no combining of categories is necessary. Starting all loans at 15 bps, fees are incremented upward loan by loan, taking for the next loan the one with the highest next MNBS:

| Step | Loan to Increment | Start Fee | New Fee | Weighted Average Servicing |
|---|---|---|---|---|
| 0 | — | — | — | 15 |
| 1 | A | 15 | 25 | 17 |
| 2 | B | 15 | 25 | 21 |
| 3 | A (tied, C is also viable) | 25 | 35 | 23 |
| 4 | C | 15 | 25 | 27 |
| 5 | B (tied, A is also viable | 25 | 30 | 29 |
| 6 | A | 35 | 50 | 32 |

Note that in step 6 the weighted average servicing became greater than the target of 30. To correct this, the tool undoes step 6 and simply increases A by 5 instead of 15. (If any of the loans has non-monotonic MNBS schedules, the tool may implement a different process to determine which loan should be incremented last.) This brings the weighted average servicing to 30 (40*0.2+30*0.4+25*0.4=30), the target value exactly. Assigned servicing fees are A: 40, B: 30, C: 25.

Example 2: Example 2 is similar to Example 1 except for the schedule of the MVS. In this example, each loan has its own MVS schedule, and for simplicity, assume that the MVS does not vary with the level of the servicing fee; therefore the MVS "schedule" reduces to a single MVS value for each loan, applicable regardless of the servicing fee level. Assume three loans having the following MVS:

| Loan A | 5.0 |
|---|---|
| Loan B | 6.0 |
| Loan C | 5.5 |

At the minimum fee of 15 bps, the tool calculates:

| Loan | UPB | Yield if Servicing = 15 | MVS | MCS | MNBS (=MVS − MCS) |
|---|---|---|---|---|---|
| A | 20 | 5.45 | 5.0 | 2.5 | 2.5 |
| B | 40 | 5.15 | 6.5 | 3.5 | 3 |
| C | 40 | 4.95 | 5.5 | 4.5 | 1 |

| Loan | Fee Range | MVS | MCS | MNBS (=MVS − MCS) |
|---|---|---|---|---|
| A | 15-35 | 5.0 | 2.5 | 2.5 |
|   | 35-50 | 5.0 | 3.5 | 1.5 |
| B | 15-30 | 6.5 | 3.5 | 3 |
|   | 30-50 | 6.5 | 4.5 | 2 |
| C | 15-50 | 5.5 | 4.5 | 1 |

The MNBS/fee-range schedules are already monotonically decreasing, and no combining of categories is necessary. Starting all loans at 15 bps, fees are incremented upward loan by loan, taking for the next loan the one with the highest next MNBS:

| Step | Loan to Increment | Start Fee | New Fee | Weighted Average Servicing |
| --- | --- | --- | --- | --- |
| 0 | — | — | — | 15 |
| 1 | B | 15 | 30 | 21 |
| 2 | A | 15 | 35 | 25 |
| 3 | B | 30 | 50 | 33 |

Note that in step 3 the weighted average servicing became greater than the target, 30. To correct this, the tool undoes step 3 and simply increases B by 12.5 instead of 20. (If any of the loans has non-monotonic MNBS schedules, the tool may implement a different process to determine which loan should be incremented last.) This brings the weighted average servicing to 30 (35*0.2+42.5*0.4+15*0.4=30), the target value exactly. Assigned servicing fees are A: 35, B: 42.5, C: 15.

Note that in this last example one of the loans had its fee set to a level that is not a whole number (42.5). The number of allowable decimal places may be changed or allow a user to specify.

Figure 17:
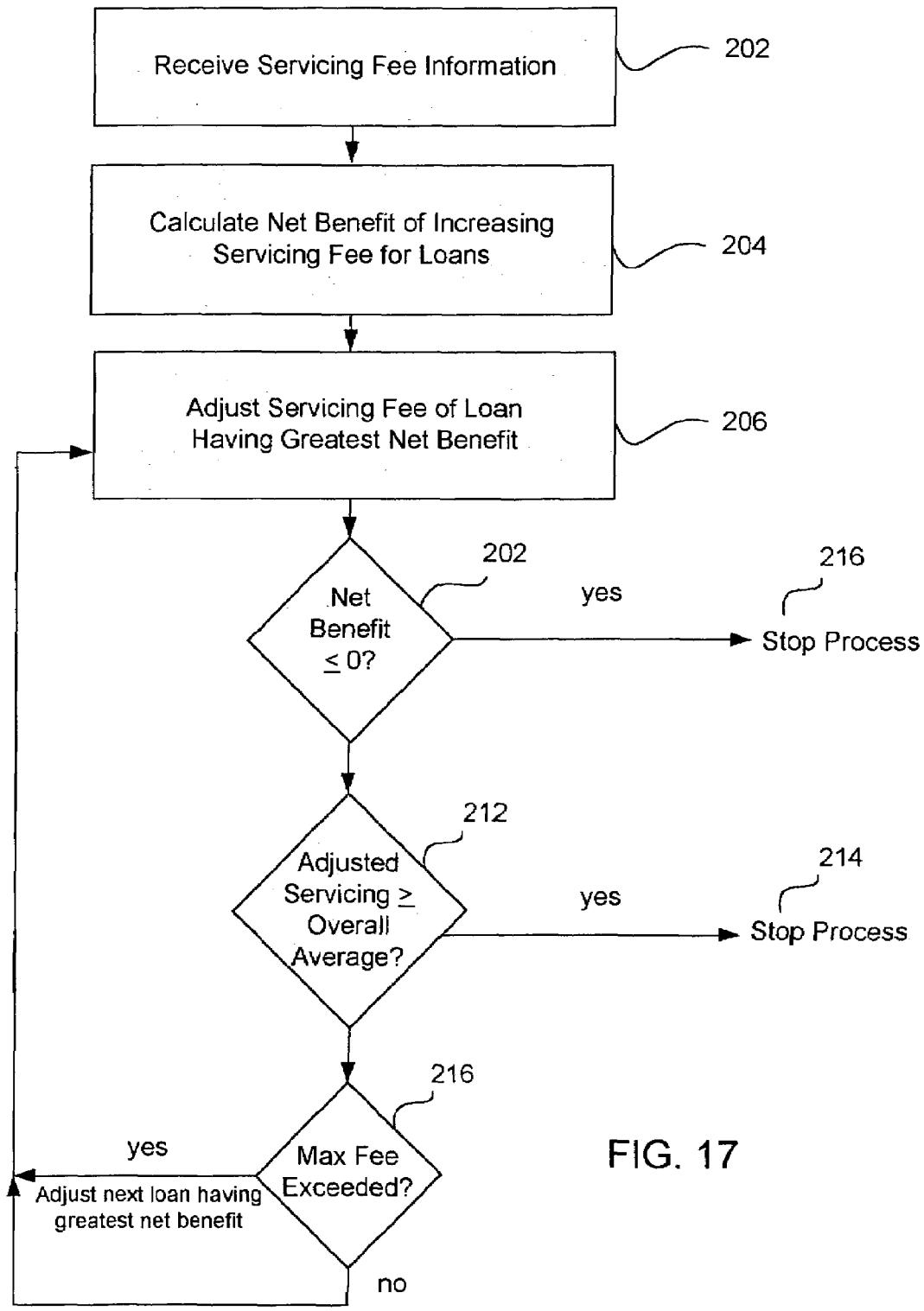
FIG. 17 is a schematic diagram depicting a method for adjusting one or more servicing fees for a set of loans according to an exemplary embodiment.

Shown in FIG. 17 is a method 200 for optimizing servicing fees for a set of loans. Method 200 comprises receiving servicing fee information for the loans in the set (step 202). Servicing fee information may include information, such as a schedule, relating to values that a purchaser and a seller of the set of loans each respectively place on potential servicing fee levels. A net benefit of increasing the servicing fee of each loan is calculated (step 204). The servicing fee of the loan having the greatest net benefit is adjusted (step 206). If the net benefit of increasing the servicing fee is less than or equal to zero (step 208), the process stops (step 210). If the net benefit of increasing the servicing fee is greater than zero (step 208), the overall average servicing fee is checked to keep it within a user specified limit (step 212). If the overall average servicing fee is greater than the specified limit, the process stops (step 214). The adjusted servicing fee is compared to the maximum specified for each loan (step 216). If the adjusted servicing fee is greater than the maximum specified for that loan, the process will identify the next loan which may be adjusted. Method 200 is an iterative process which will adjust or optimize servicing fees for a set of loans until the net benefit of adjusting the servicing fees is less than or equal to zero, an overall average is exceeded, or a maximum for each loan is met.

The systems and methods disclosed advantageously provide a single streamlined process that that permits pricing, selling and funding of mortgage loans. The systems and methods advantageously provide for a single transaction to sell and fund from one to many (e.g., hundreds) of loans that returns a single reply transaction. The systems and methods advantageously offers the ability to accept in one file any number of loans of any product and remittance type.

The systems and methods disclosed advantageously enable accurate funding of the loan at the time of sale by tying the funding of the loan (total proceeds) to the sale of the loan. That is, the lender is funded for each loan that is successfully committed and priced. The systems and methods disclosed also advantageously provides lenders with the ability to adjust the amount of servicing they wish to obtain.

Many other changes and modifications may be made to the present invention without departing from the spirit thereof. The scope of these and other changes will become apparent from the appended claims.

What is claimed is:

1. A computer hardware system comprising: a processing unit; and a storage device coupled to the processing unit and having physically-embodied computer program elements, the computer program elements being executed by the processor implementing a process for optimizing a service fee for each loan in a group of loans, the process comprising: setting a target average servicing fee for the group of loans and storing the target average servicing fee in a database; setting, for each loan in the group of loans, a minimum servicing fee and a maximum servicing fee and storing the minimum servicing fee and the maximum servicing fee in a database; determining for each loan the marginal net benefit to the lender for a change to the servicing fee based upon the stored minimum servicing fee; determining unpaid principal balance points for the group of loans, the unpaid principal balance points are determined from total unpaid principal balance of the group of loans multiplied by the difference between the average service fee and the minimum servicing fee; and iteratively adjusting the servicing fee by: determining a weighted average servicing fee for the group of loans, the weighted average servicing fee comprising the average of the sum of an interim servicing fee and an outstanding principal balance for each loan, identifying a loan having the largest marginal net benefit to the lender, adjusting the servicing fee by a predetermined number of basis points for the loan, recalculating the marginal net benefit to the lender for the loan using the adjusted servicing fee, reducing the unpaid principal balance points by an amount equal to the unpaid principal balance of the loan whose servicing fee was adjusted by the difference between the loan's servicing fee prior to adjustment and after adjustment, and wherein the iterative adjustment proceeds until the unpaid principal balance points are less than or equal to zero or the adjusted servicing fee for each loan in the group of loans equals the set maximum servicing fee.

2. The system of claim 1, wherein the storage device is further configured to store information relating a value that a purchaser and a value that a seller of the group of loans each respectively place on potential servicing fee levels.

3. The system of claim 1, wherein the marginal net benefit of increasing servicing fees further comprises a marginal cost of an additional servicing fee expressed as an amount a secondary mortgage purchaser will pay for the loan if a rate of the loan is reduced by one basis point.

4. The system of claim 1, wherein the predetermined number of basis points used in determining the marginal net benefit is a one basis point increase to servicing fee.

* * * * *